United States Patent [19]
Schlosser et al.

[11] Patent Number: 5,934,183
[45] Date of Patent: *Aug. 10, 1999

[54] PORTABLE GAS GRILL

[75] Inventors: Erich J. Schlosser, Barrington; J. Michael Alden, Palatine; Robert T. Stephen, Barrington, all of Ill.

[73] Assignee: Weber-Stephen Products Co., Palatine, Ill.

[ * ] Notice: This patent is subject to a terminal disclaimer.

[21] Appl. No.: 08/695,287

[22] Filed: Aug. 9, 1996

Related U.S. Application Data

[63] Continuation-in-part of application No. 08/437,137, May 5, 1995, Pat. No. 5,765,469.
[51] Int. Cl.⁶ .................................................. A47J 37/00
[52] U.S. Cl. .......................................... 99/385; 126/25 R
[58] Field of Search ............................. 99/340, 385, 393, 99/400, 422, 425, 446; 126/25 R, 41 R

[56] References Cited

U.S. PATENT DOCUMENTS

| 4,869,228 | 9/1989 | Sorensen ................................. 126/25 R |
| 4,886,045 | 12/1989 | Ducate, Jr. et al. .................. 126/41 R |
| 5,065,734 | 11/1991 | Elliott ............................... 126/25 R X |
| 5,070,776 | 12/1991 | Schlosser et al. ....................... 99/450 |
| 5,483,947 | 1/1996 | Giebel et al. ..................... 126/25 R X |

FOREIGN PATENT DOCUMENTS 967375  8/1964  United Kingdom .

*Primary Examiner*—Reginald L. Alexander
*Attorney, Agent, or Firm*—Wallenstein & Wagner, Ltd.

[57] ABSTRACT

The grills (10,1010,1011) disclosed have many modular components, each being supported by horizontal support members (30,32). These components include the firebox (100), a hood assembly (1300), two or more work shelves (1430), two opposed extension members (1410) and one or more storage bins (1750). A new thermometer (1800) is also disclosed.

26 Claims, 22 Drawing Sheets

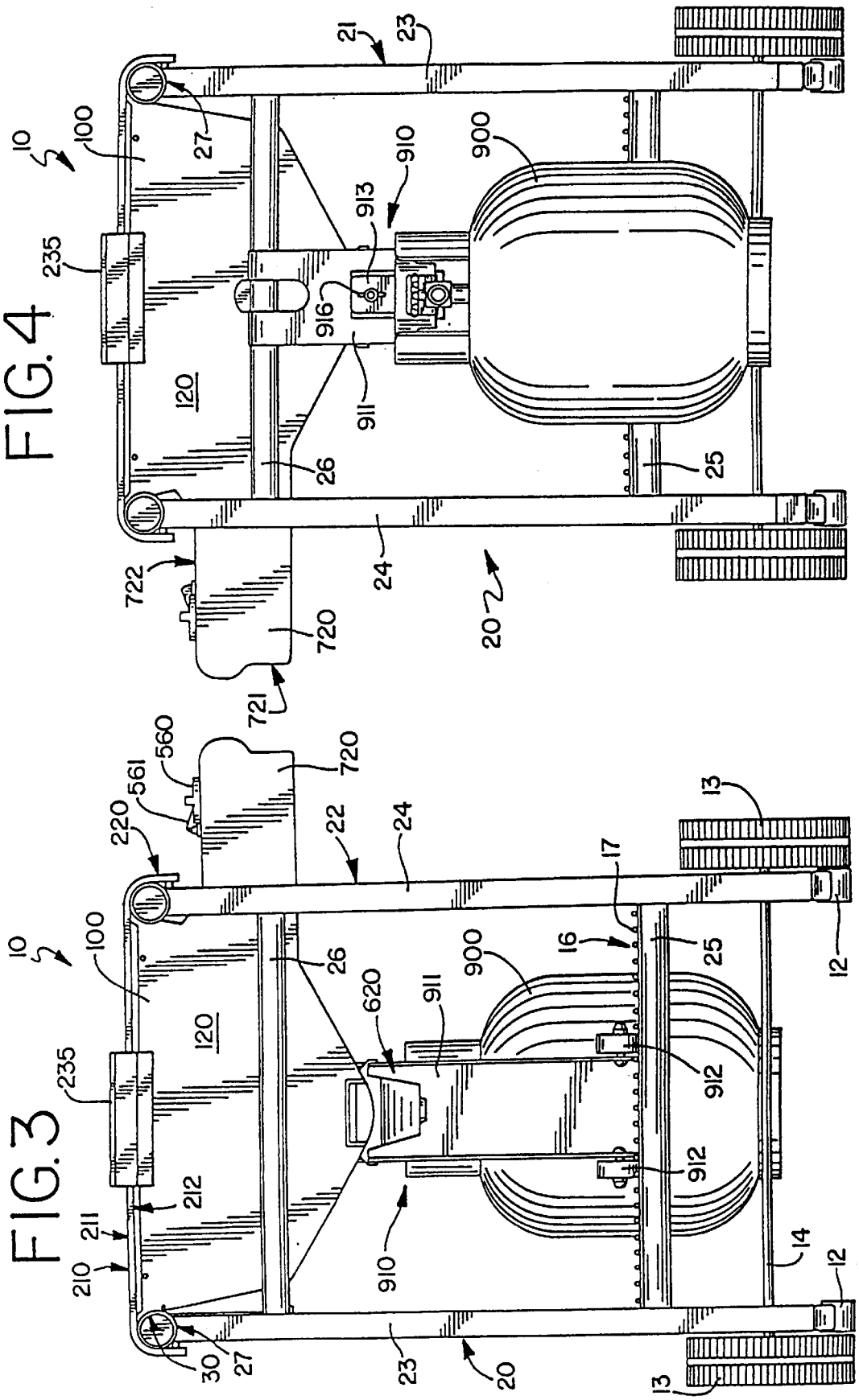

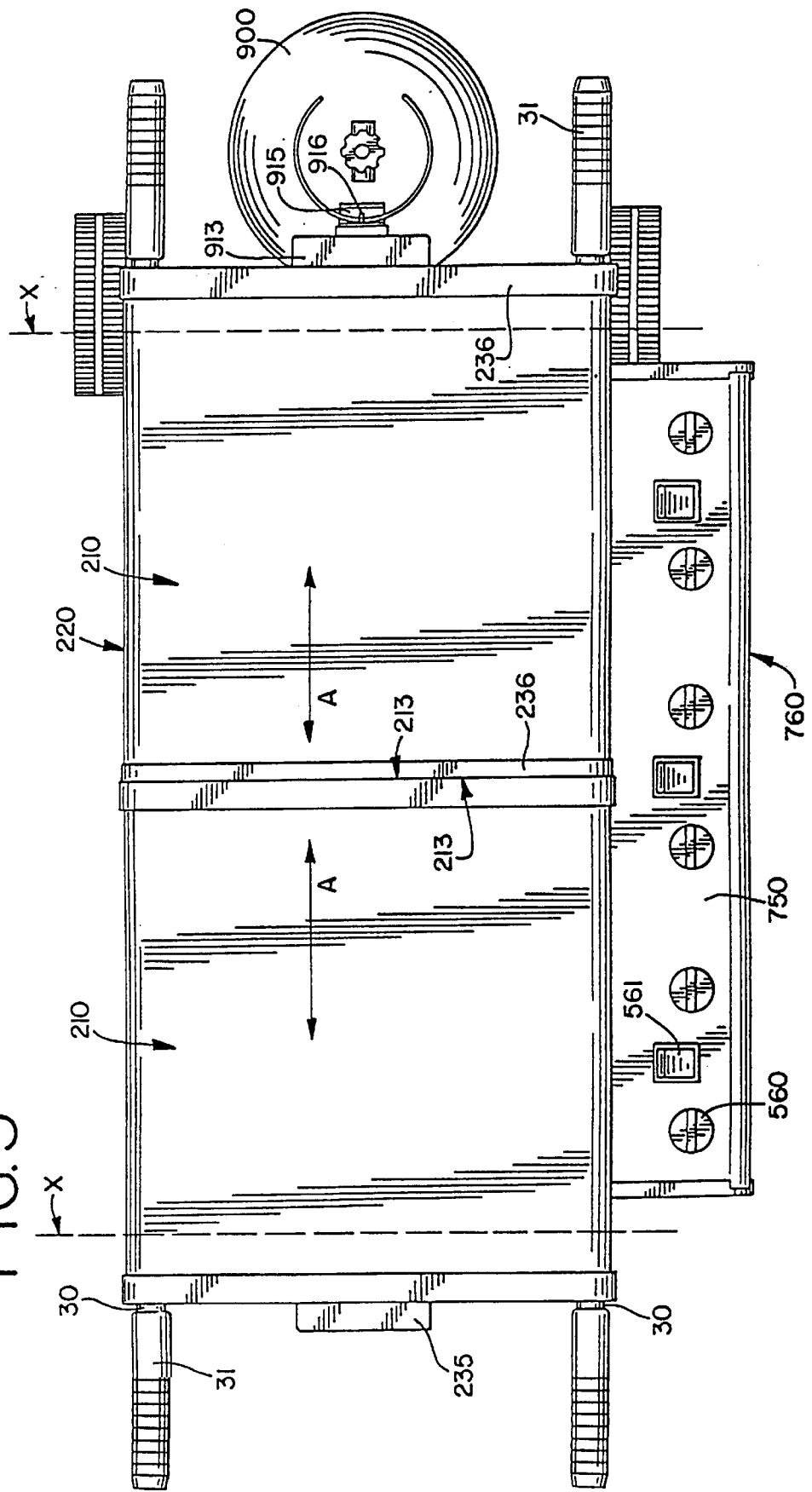

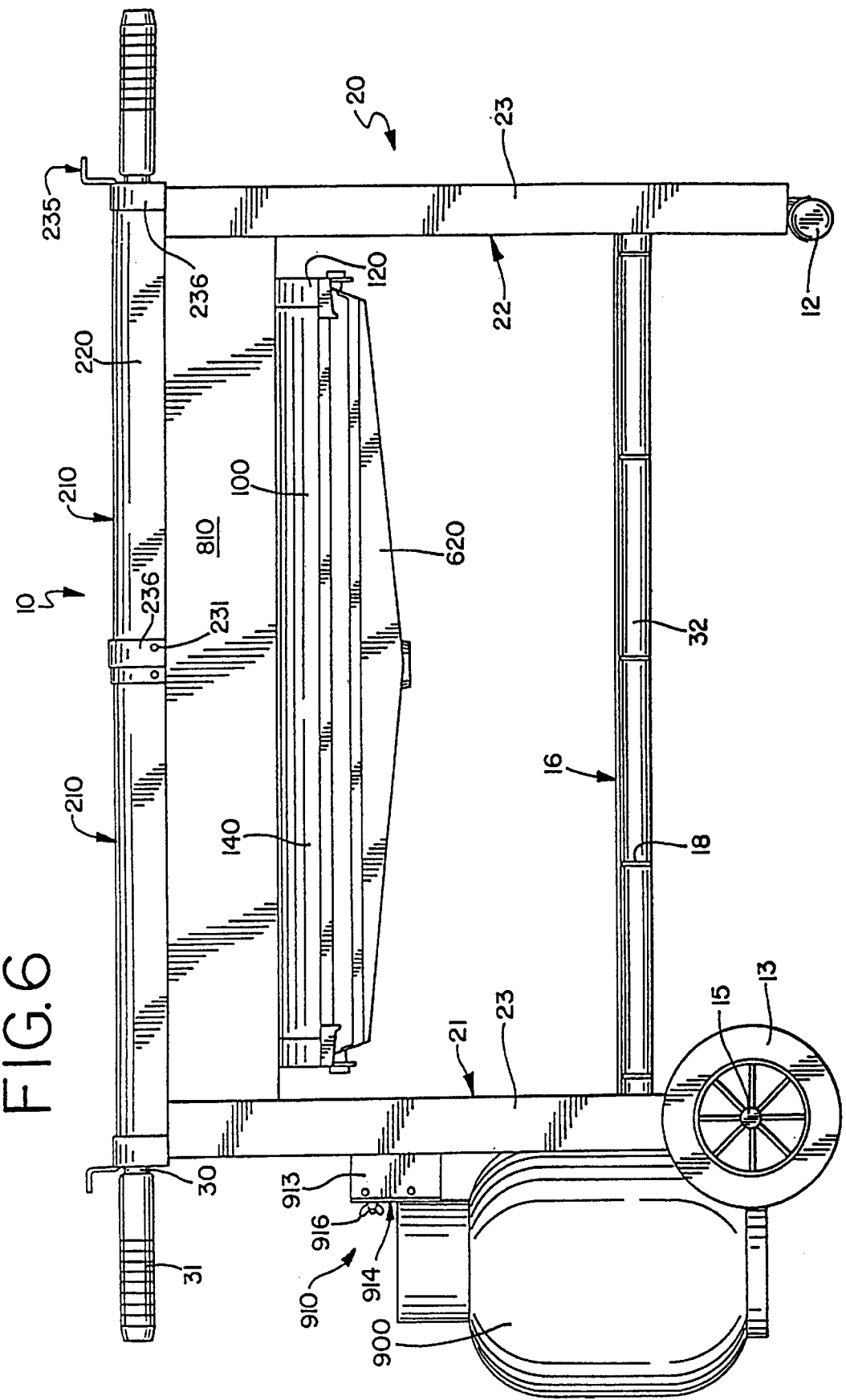

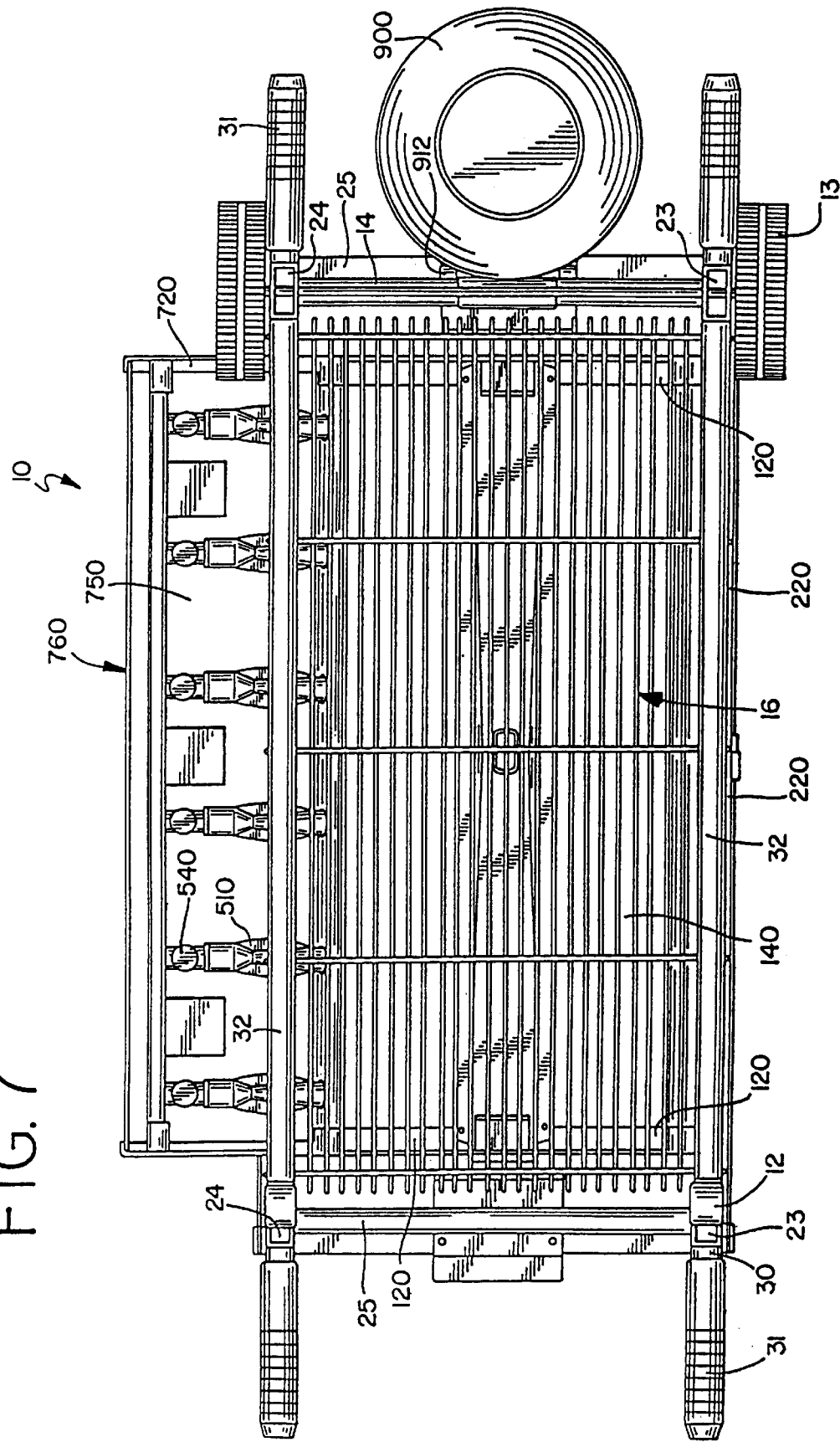

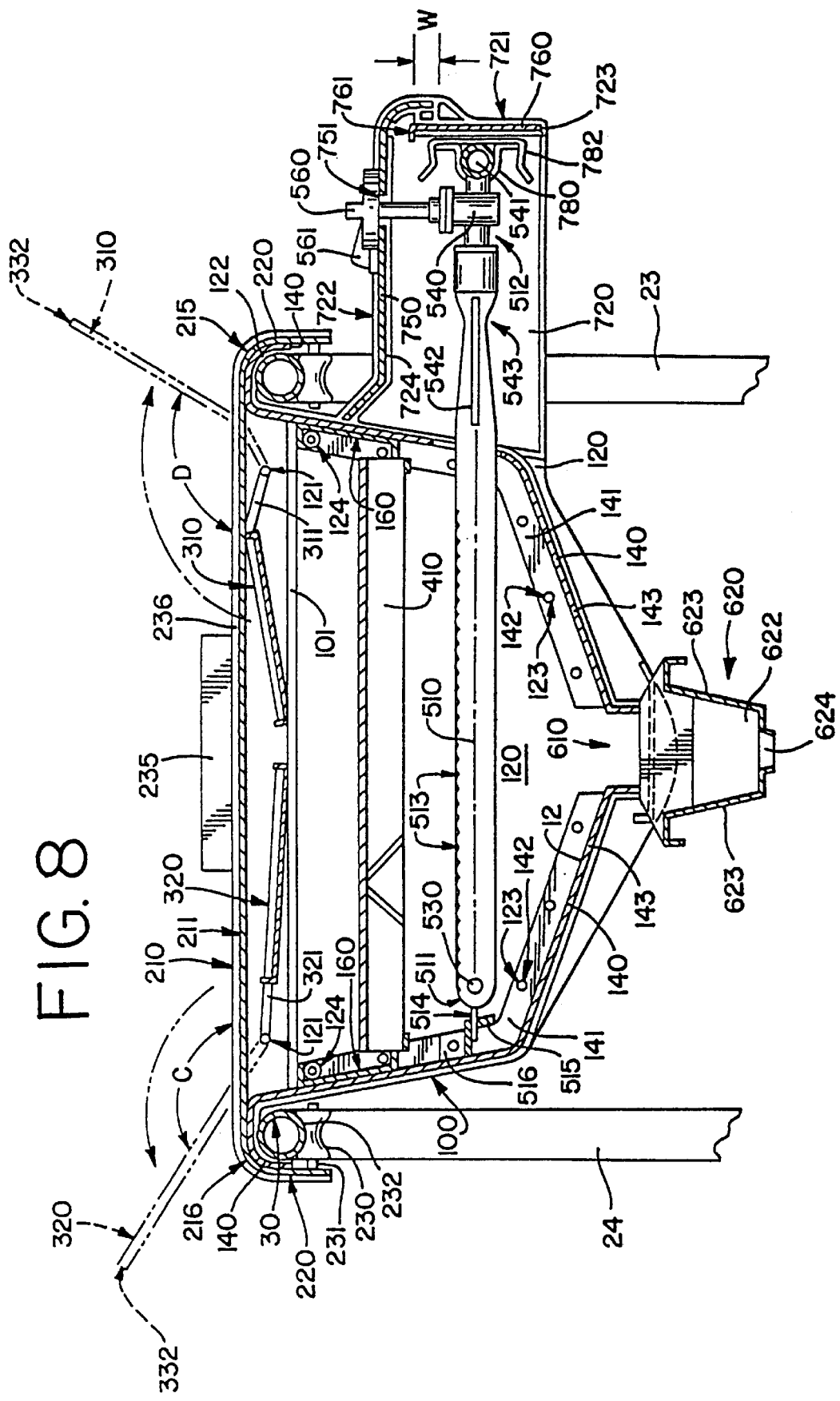

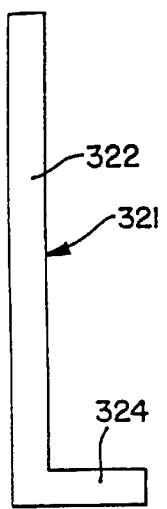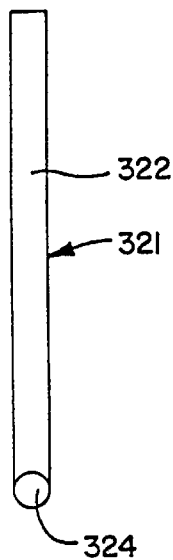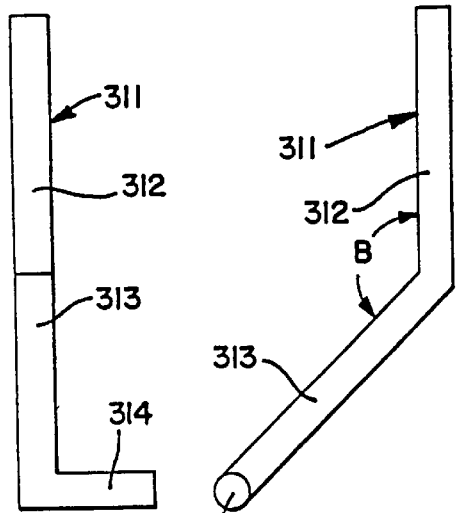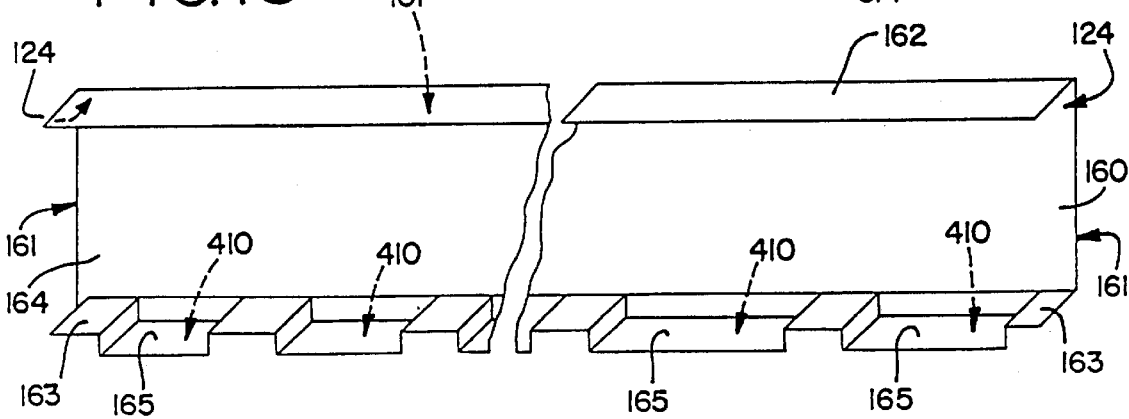

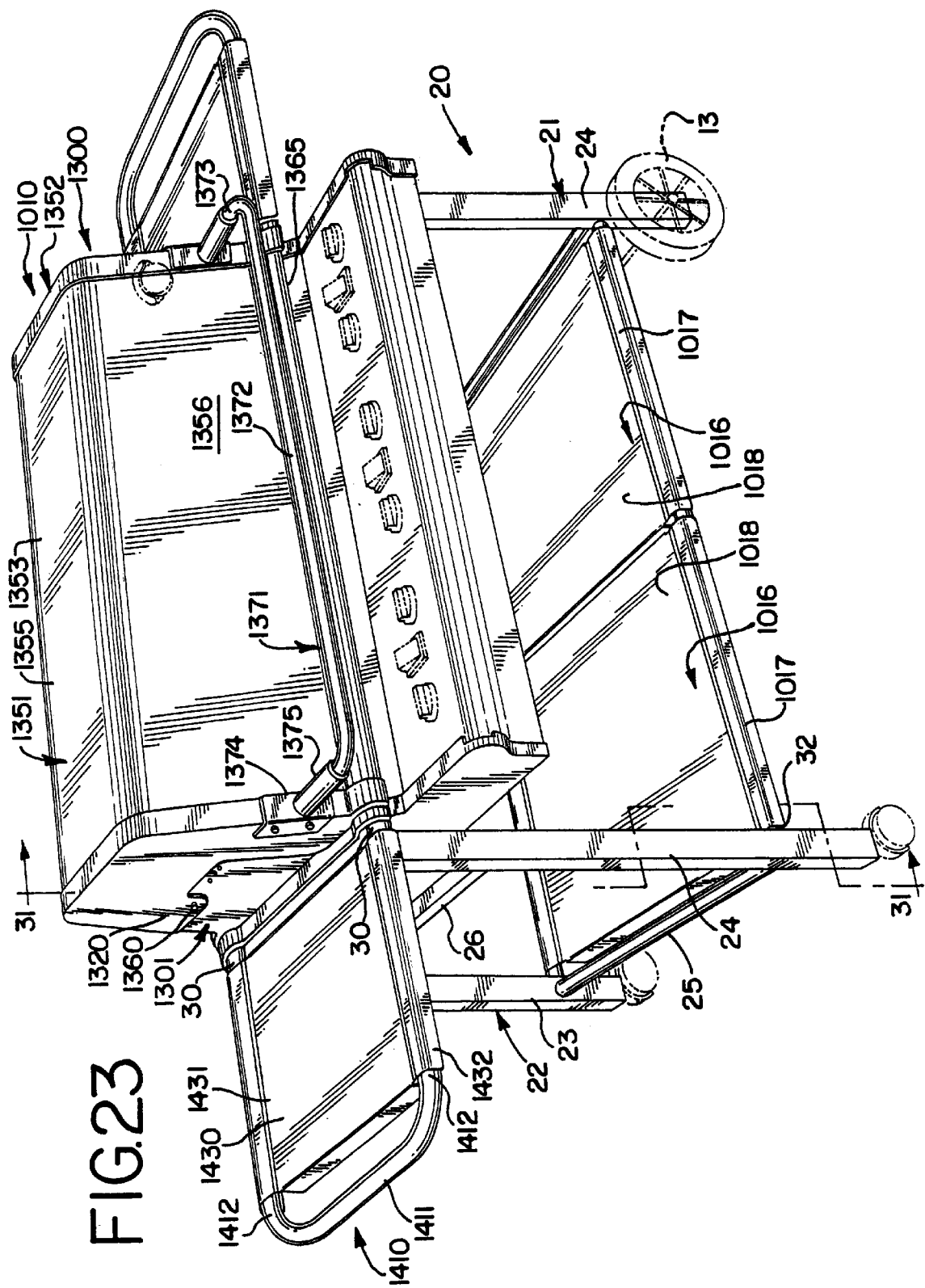

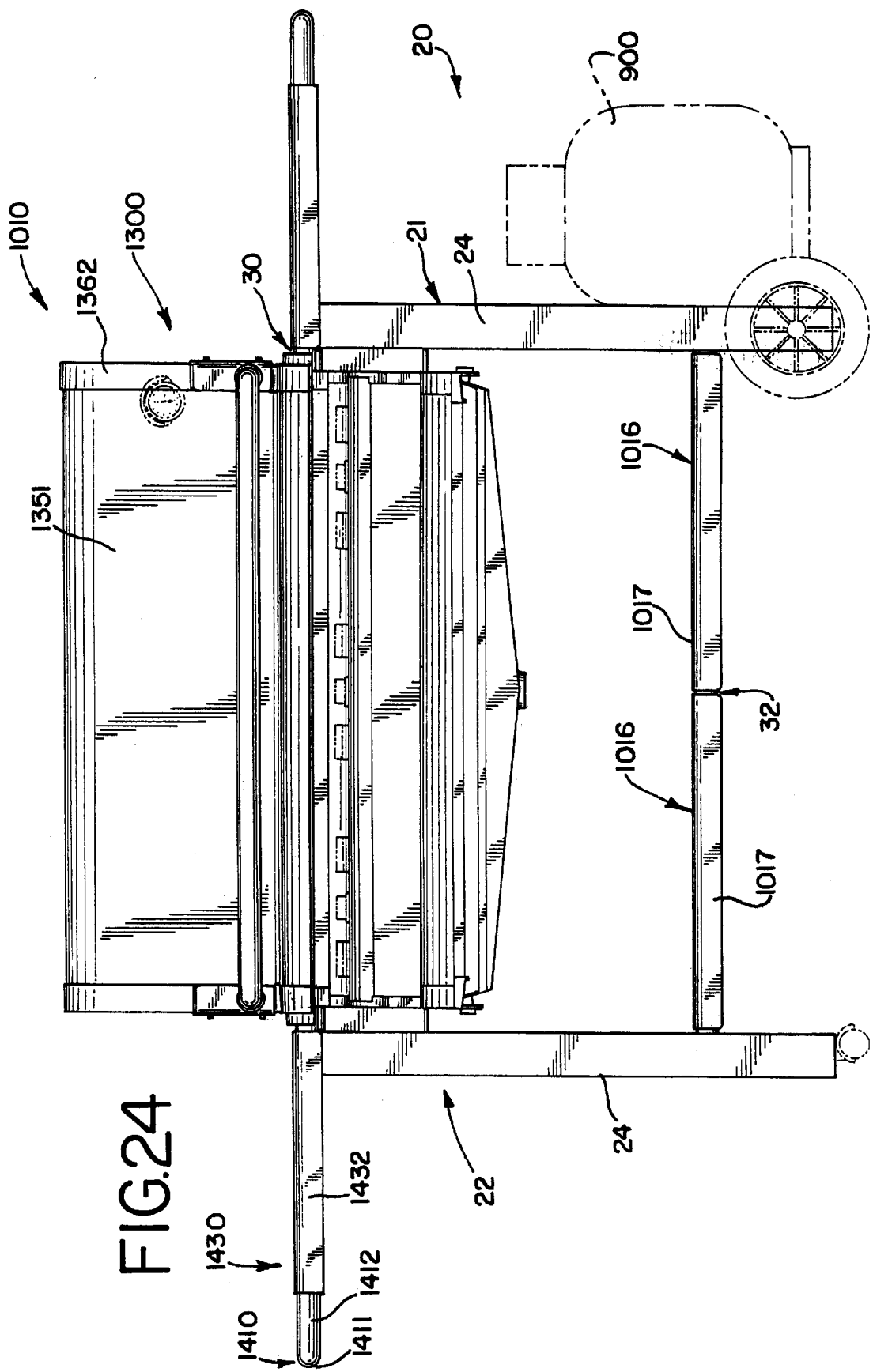

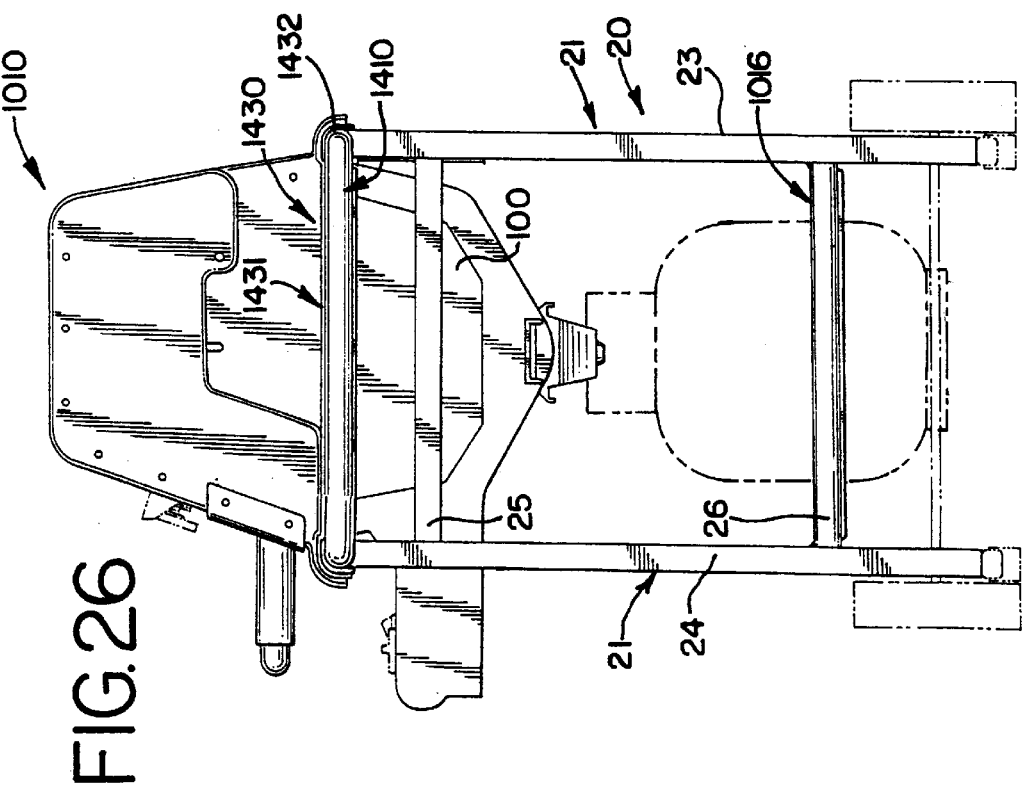
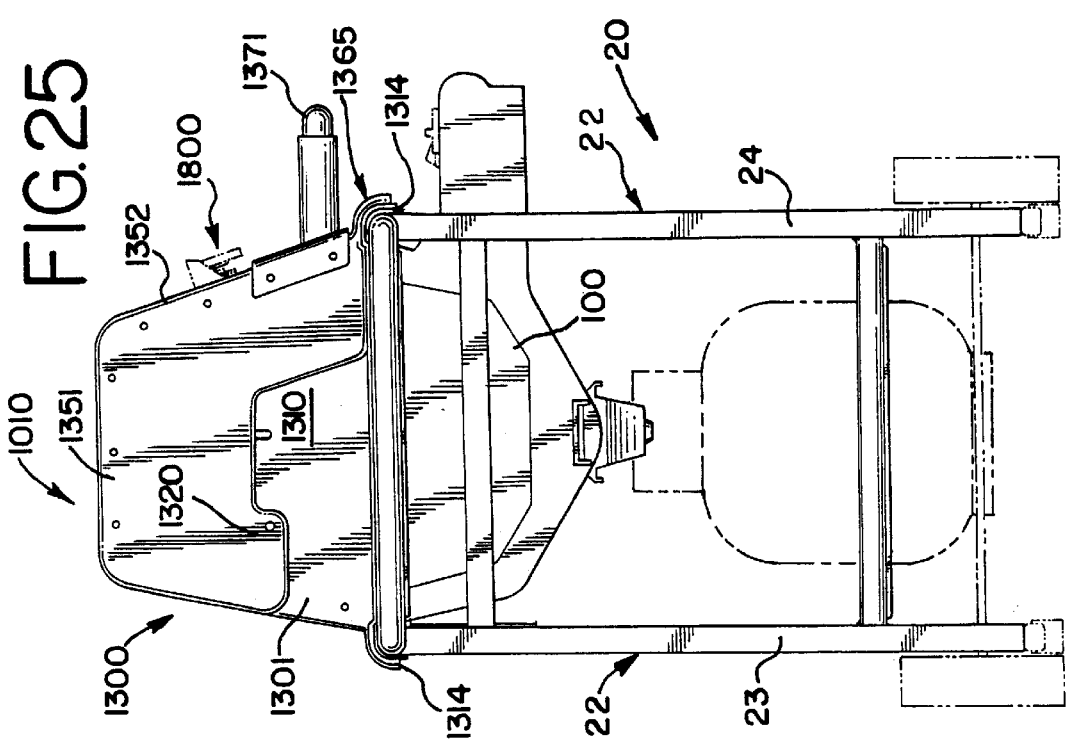

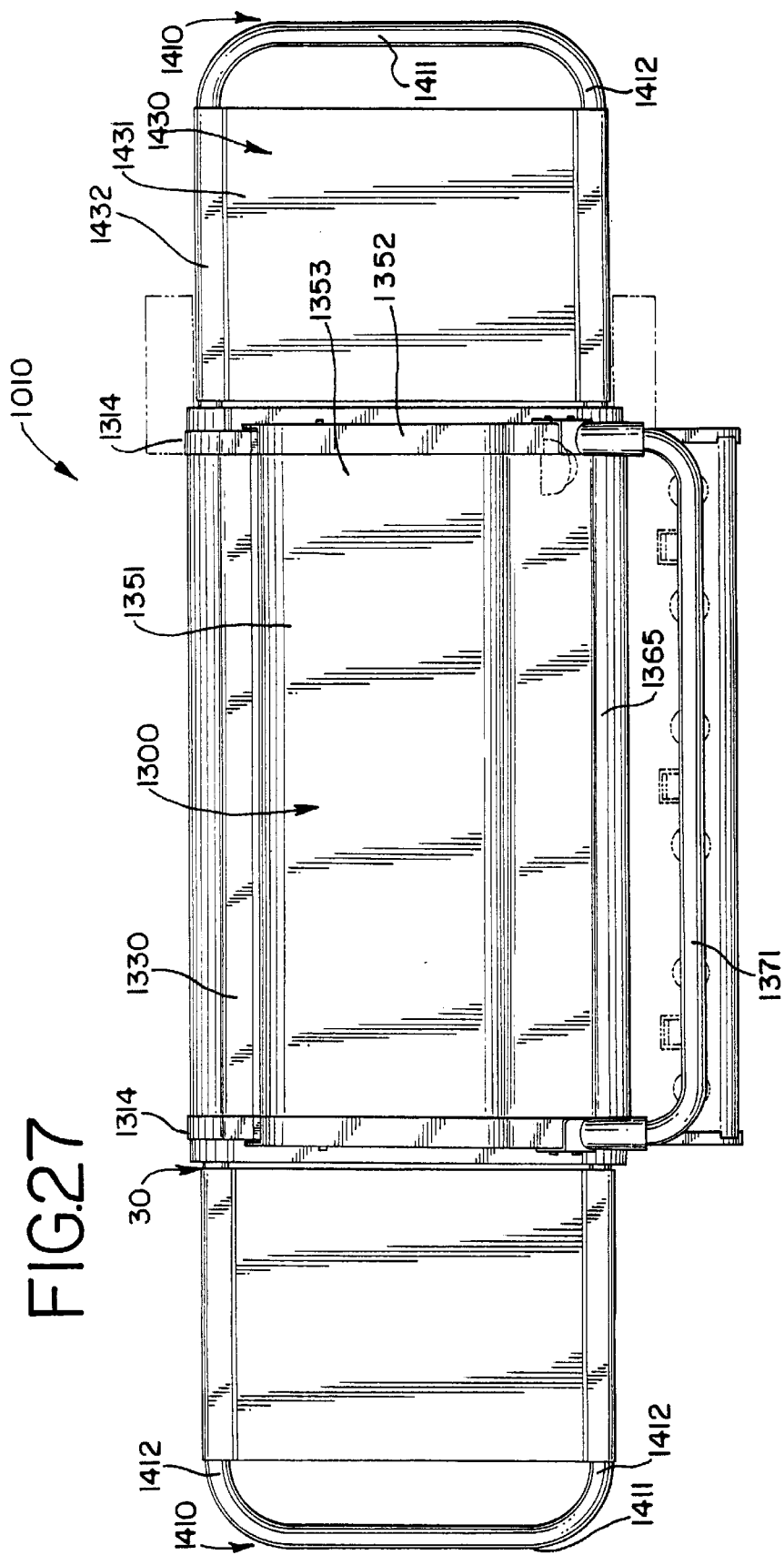

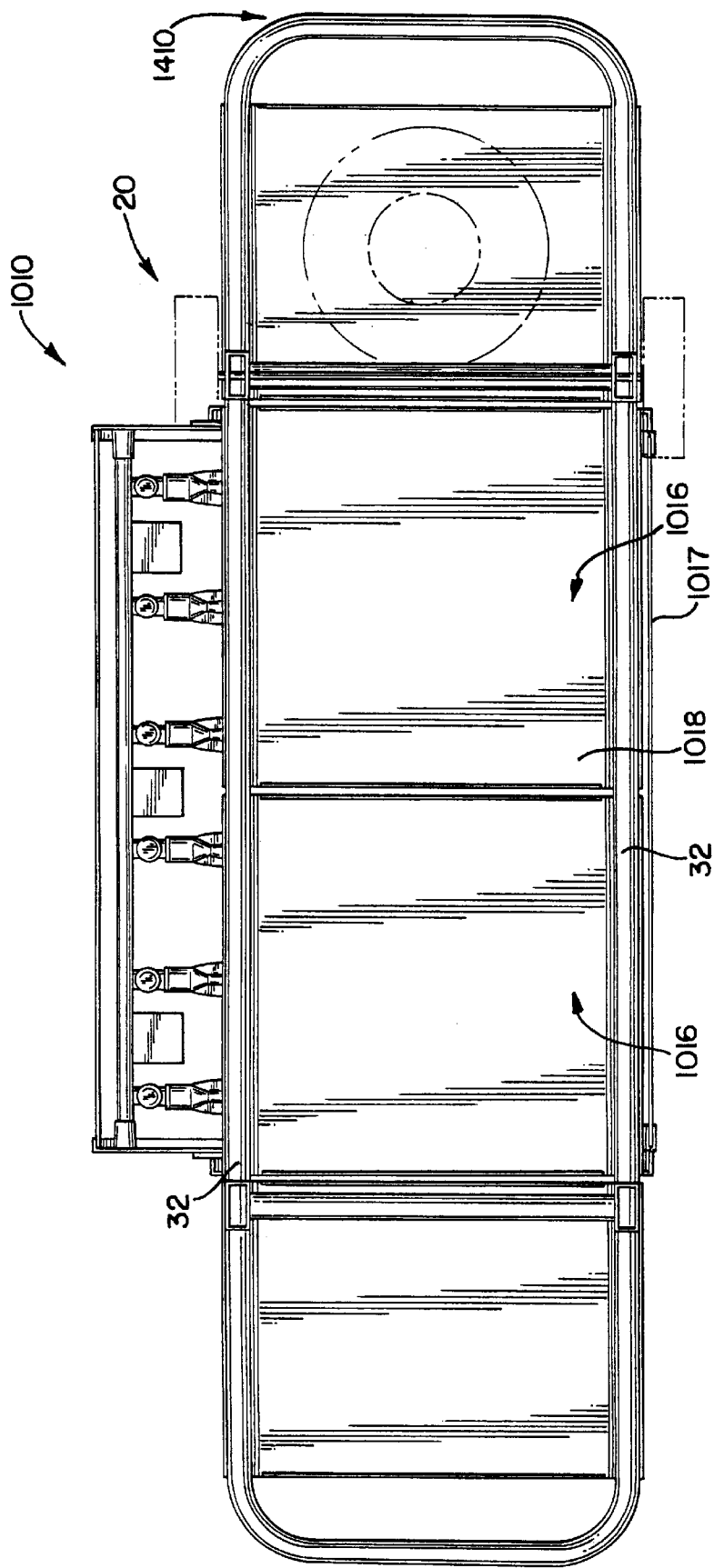

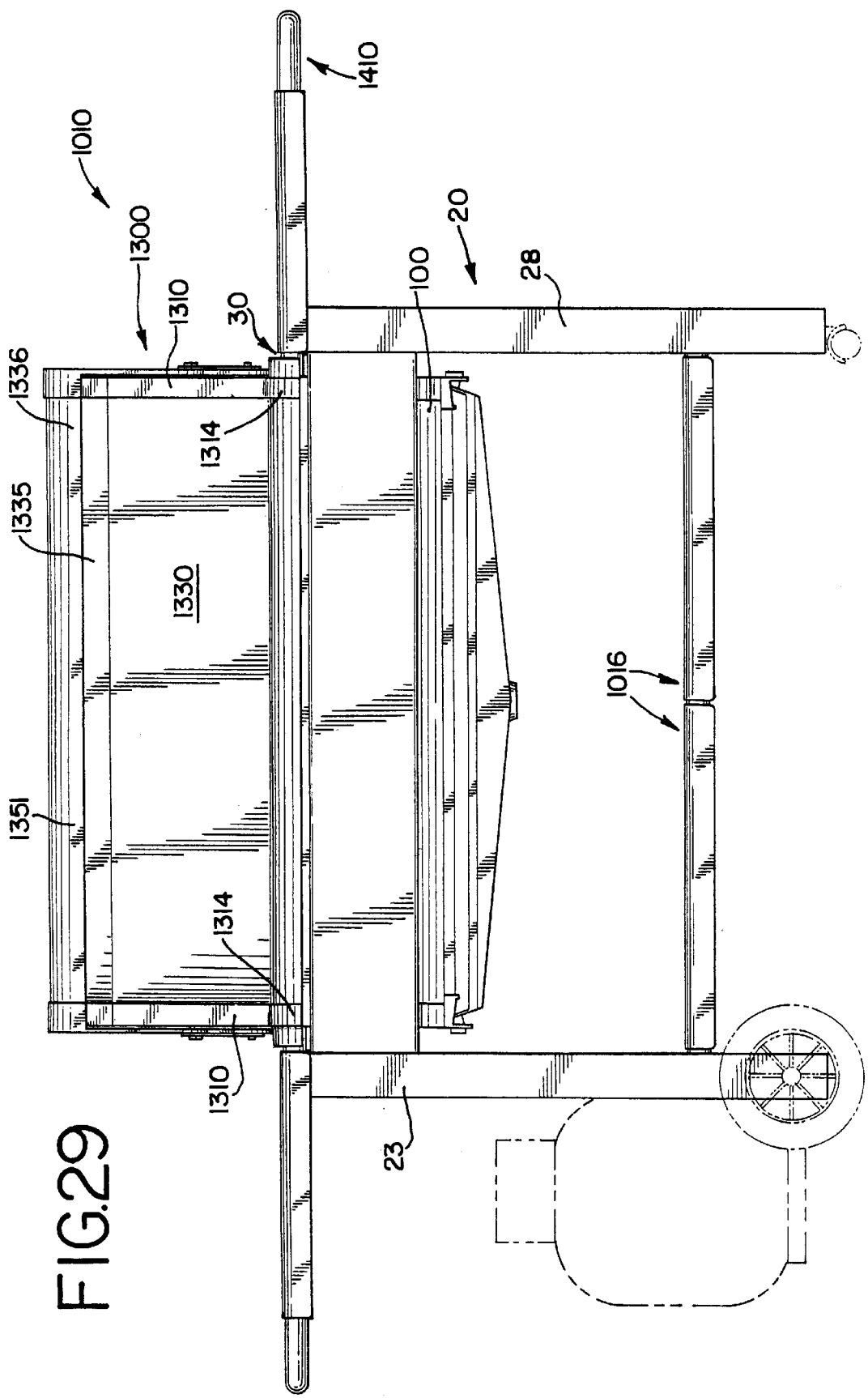

PORTABLE GAS GRILL

REFERENCE TO RELATED APPLICATION

This is a Continuation-In-Part Application of U.S. Ser. No. 08/437,137, filed May 5, 1995, now U.S. Pat. No. 5,765,469 for a PORTABLE GAS GRILL.

TECHNICAL FIELD

The present invention relates generally to barbecue cooking devices, and more particularly, to gas barbecue grills.

BACKGROUND PRIOR ART

Today, gas grills are very popular for outdoor cooking. They are convenient, clean and safe. They generally consist of a support frame or cart, a firebox or cooking chamber with a cover, one or more gas burners, lava rocks or sear bars, and a cooking grid. Numerous models exist in all types of styles, sizes and shapes. Some are pre-assembled and others must be assembled by the consumer or owner. The assembling of a portable grill can range from relatively easy and tool-free to extremely difficult and labor and tool intensive.

Two very popular product lines on the market are the GENESIS® Series Gas Barbecues and the SPIRIT™ Series Gas Barbecues, both made by WEBER-STEPHEN PRODUCTS CO., Palatine, Ill. These products have met with great success in the market. Even though these high quality grills have introduced many innovative features, they have maintained their ease of assembly. Such innovative and patented features include, among others: numerous design breakthroughs (U.S. Pat. Nos. DES 293,067 and DES 316,355); burner tube assemblies (U.S. Pat. No. 4,677,964); scale mechanisms for indicating the amount of fuel in the tank (U.S. Pat. No. 4,677,964); inverted V-shaped sear bars that go over the burners (U.S. Pat. No. 4,727,853); multipurpose thermometers (U.S. Pat. Nos. 4,777,927 and 4,966,125); burner guards for preventing spiders from entering the burners (U.S. Pat. No. 4,829,978); side burner assemblies for use with portable grills (U.S. Pat. No. 4,860,724); ignitor housings for protecting the gas ignitors (U.S. Pat. No. 4,941,817); warming cradles supported on the grill cover (U.S. Pat. No. 5,070,776); steam and wood chip smokers (U.S. Pat. No. 5,167,183); and, rotisserie and skewer assemblies (U.S. Pat. No. 5,245,917). Additional patents and other innovations are also included in WEBER® grills.

In a continuous effort to improve upon current designs and products, add innovative features, and to ensure a grill's ease of assemblage, the present invention was developed.

SUMMARY OF THE INVENTION

The assembly of the present invention is structurally engineered such that it can be easily assembled by a purchaser without the use of any special tools and in a simplified manner. All that is needed to construct the grill assembly is a couple of wrenches and possibly a hammer. The flexibility of the present assembly is great.

In one embodiment, work surfaces double as covers. In another embodiment, the grill includes hood with a hinged cover. In a multi-burner configuration, there are distinct and separate zones for grilling. In one zone, one can barbecue food on a wire or a porcelain enamel cooking grate; in another grilling zone, one can fry food by using a griddle; in a further zone, one can smoke food with a smoker. Consequently, food can be grilled, fried, smoked, warmed, rotisseried, boiled. A myriad of combinations and uses are thus available for the user. Or, one can grill in a single grilling zone and leave the other zone or zones off. In short, the combinations of cooking styles and uses available to the user are endless.

In particular, a first grill embodiment is disclosed having a support frame or cart of generally rectangular configuration with a plurality of vertical posts supporting a firebox above the ground. The firebox has opposed cast metal side members and porcelainized metal (metal having a porcelain enameled surface or coating thereon) opposed end members, that being a front end member and a rear end member, with an opening at the top thereof; a substantially horizontal cooking grid, cooking surface or cooking vessel is supported below the opening therein. At least one burner is also supported in the firebox. In addition, both the side members and the end members are inwardly tapered to a lower slot created or formed between the end members for permitting grease to pass therethrough.

According to another aspect of the present invention, the side members have a co-planer extension piece of cast metal with a front and a top edge and an upper channel therein along the top edge and. A porcelainized metal top face plate having opposed sides is securely held at each side in this upper channel. This top face plate further has apertures therein for receiving controls for the burners of the grill. In addition, the extension piece further includes a porcelainized metal front channel therein along the front edge. A front face plate having opposed sides is securely held at each side in this front channel of the extension piece of a side member.

As to the burner supported inside the firebox, it comprising at least one pair of two elongated parallel burner units or tubes. Each unit has two ends, a plurality of spaced apertures therein, a flattened portion at one end and at the other end means for controlling the fuel into the unit and means for igniting the fuel. The flattened portion of the burner units is connected to a brace, which in turn, is connected to either the two side members or the two end members. Additionally, the pair of parallel burner units is connected by and in communication with a pilot tube adjacent the one end of each burner unit so that one of the pair of burner units may be ignited and the other of the pair of burner units is ignited from the pilot tube.

There is at least one sear bar seated above each burner unit in the firebox. The sear bars consist of an elongated inverted V-shaped member formed of heat conductive material to define inclined grease-evaporating surfaces that extend generally parallel to the burner unit.

For fireboxes of different sizes, there can be two, three or even more pairs of burner units creating distinct and separate grilling zones. Each pair of parallel burner units is connected by and in communication with a pilot tube adjacent the one end of each burner unit so that one of the pair of burner units may be ignited and the other of the pair of burner units is ignited from the pilot tube.

With respect to the firebox, each side member includes two spaced apart inwardly projecting protuberances, each protuberance being adjacent the opening and adjacent an end member. A pair of substantially U-shaped supports, each having two sides and an upper ledge and a lower ledge and a base portion disposed therebetween, are oriented with the upper and lower ledges substantially horizontal and facing into the firebox and with the base portion being substantially vertical, and are hung. In particular, each side of the upper ledge of the U-shaped support is positioned to rest on a protuberance attached to a side member. The cooking grid, cooking surface or cooking vessel are consequently seated on the upper ledges of the pair of U-shaped supports. And, the lower ledge of each U-shaped support further includes spaced apart seats adapted for seating the plurality of V-shaped sear bars in spaced relation to one another above the burners and below the cooking grid, cooking surface or cooking vessel.

As to the grease collector, each side member includes an inwardly projecting shelf adjacent a lower edge thereof and the grease collector includes an L-shaped bracket at each side thereof for sliding onto and off of the projecting shelves below the slot in the firebox. The grease collector further includes inwardly tapering walls leading to a lower opening therein, and further includes a removable grease collector tray supported below the lower opening.

A second grill embodiment is also disclosed. This grill incorporates many of the components, elements and features of the first grill embodiment just described. This second grill also has a support frame with front and rear horizontal, longitudinal and parallel members. The firebox, discussed above, has side members, each with outwardly projecting opposed projections contoured to cover one of the longitudinal members. These projections are thus shaped, structured and adapted for supporting the firebox between the longitudinal members. One projection extends towards the front longitudinal member and the other projection extends towards the rear longitudinal member. The cover associated with this second grill embodiment has a hinged lid pivotable between an open and closed position about an axis disposed above and parallel to the rear longitudinal member.

According to a further aspect of this second embodiment, the covering for the firebox is a two part hood assembly having a base assembly supported on the upper longitudinal members and a cover supported on and pivoting about this base assembly. The base assembly includes two opposed arms; the first arm extends towards the front longitudinal member and is contoured to rest upon the front longitudinal member; and, the second arm extends towards the rear longitudinal member and is contoured to rest upon the rear longitudinal member. This base assembly employs two side walls and a rear wall. It is the each side walls that have constructed therein the two outwardly projecting fingers or arms. Each finger/arm is contoured to cover one of the longitudinal members and is adapted for maintaining the base assembly in position. This modular construction results in each projection from the side wall of the firebox being nested between a finger/arm from the base assembly and the upper longitudinal support members. In addition, the base assembly can include conventional means to secure it to either the firebox or the longitudinal members.

The cover is connected to the base assembly by pivot pins attached to the opposed side walls of the base assembly in a location forwardly of the base assembly's rear wall. The cover includes two opposed, parallel side walls, a center panel disposed therebetween having a front wall, and a U-shaped handle securely fastened to the side walls, straddling the front wall. In the preferred embodiment, the side walls are cast metal and the center panel is porcelainized metal. A front lip at the front of the cover is contoured and adapted for engaging and resting upon either the arms covering a support member or the support member itself. Thus, the arm is nestled between the lip on the cover and either a support member or a projection.

There are also U-shaped extension members cooperating or coupled with the ends of the upper longitudinal support members. As the support members and extension members are tubular, the extension member can be (a) force fitted either inside or around the support members, or (b) integral or welded to the support members.

A plurality of modular work shelves are also incorporated into the grill. Each work shelf has at least two opposing outwardly extending flanges contoured to engage and rest upon an upper surface of the support members to support the work shelf between the support members. These work shelves can also be used as trays to carry items to and from the grill.

Similarly, a lower shelf, like the work shelf, has at least two flanges contoured to engage and rest upon an upper surface of the lower longitudinal support members (positioned below the upper longitudinal support members).

Finally, a removable thermometer is mounted on the cover. The thermometer has an indicator at one end and a probe protruding through a wall of the cover. The thermometer threads through a hole in the cover and is held in place by a thermometer bracket or clip, attached to an inner surface of the cover. This bracket/clip has a base with a passageway and generally opposed fingers extending from the base to a distal end in a direction generally towards the passageway. The fingers are resilient and engage the thermometer probe to provide a retention force. A sleeve aligned with the bracket/clip is also secured to the outer surface of the cover wall. This sleeve has a grommet to receive the probe and a protection wall projecting outwardly therefrom to protect the indicator body. With this construction, the thermometer can be easily removed from the cover and inserted into food to sense the temperature and then returned to the cover.

Other features and advantages of the invention will be apparent from the following specification taken in conjunction with the following drawings.

BRIEF DESCRIPTION OF THE DRAWINGS

In order that the present invention may be more fully understood, it will now be described by way of example, with reference to the accompanying drawings in which:

FIG. 3 is a left side elevation view of the grill of FIGS. 1 and 2;

FIG. 4 is a right side elevation view of the grill of FIGS. 1–3;

FIG. 5 is a top plan view of the grill of FIGS. 1–4;

FIG. 6 is a rear elevation view of the grill of FIGS. 1–5;

FIG. 7 is a bottom plan view of the grill of FIGS. 1–6;

FIG. 8 is a partial sectional view along line 8—8 in FIG. 1;

FIG. 14 is an end elevation view of a first pivot pin for the rear cooking guard;

FIG. 15 is a side elevation view of the first pivot pin for the rear cooking guard;

FIG. 16 is an end elevation view of a second pivot pin for the front cooking guard;

FIG. 17 is a side elevation view of the pivot pin for the front cooking guard;

FIG. 18 is a perspective front view of a U-shaped support;

FIG. 23 is a top perspective view of a second grill embodiment made in accordance with the teachings of the present invention;

FIG. 24 is a front elevation view of the grill of FIG. 23;

FIG. 25 is a left side elevation view of the grill of FIGS. 23 and 24;

FIG. 26 is a right side elevation view of the grill of FIGS. 23–25;

FIG. 27 is a top plan view of the grill of FIGS. 23–26;

FIG. 28 is a bottom plan view of the grill of FIGS. 23–27;

FIG. 29 is a rear elevation view of the grill of FIGS. 23–28;

DETAILED DESCRIPTION

Figure 1:
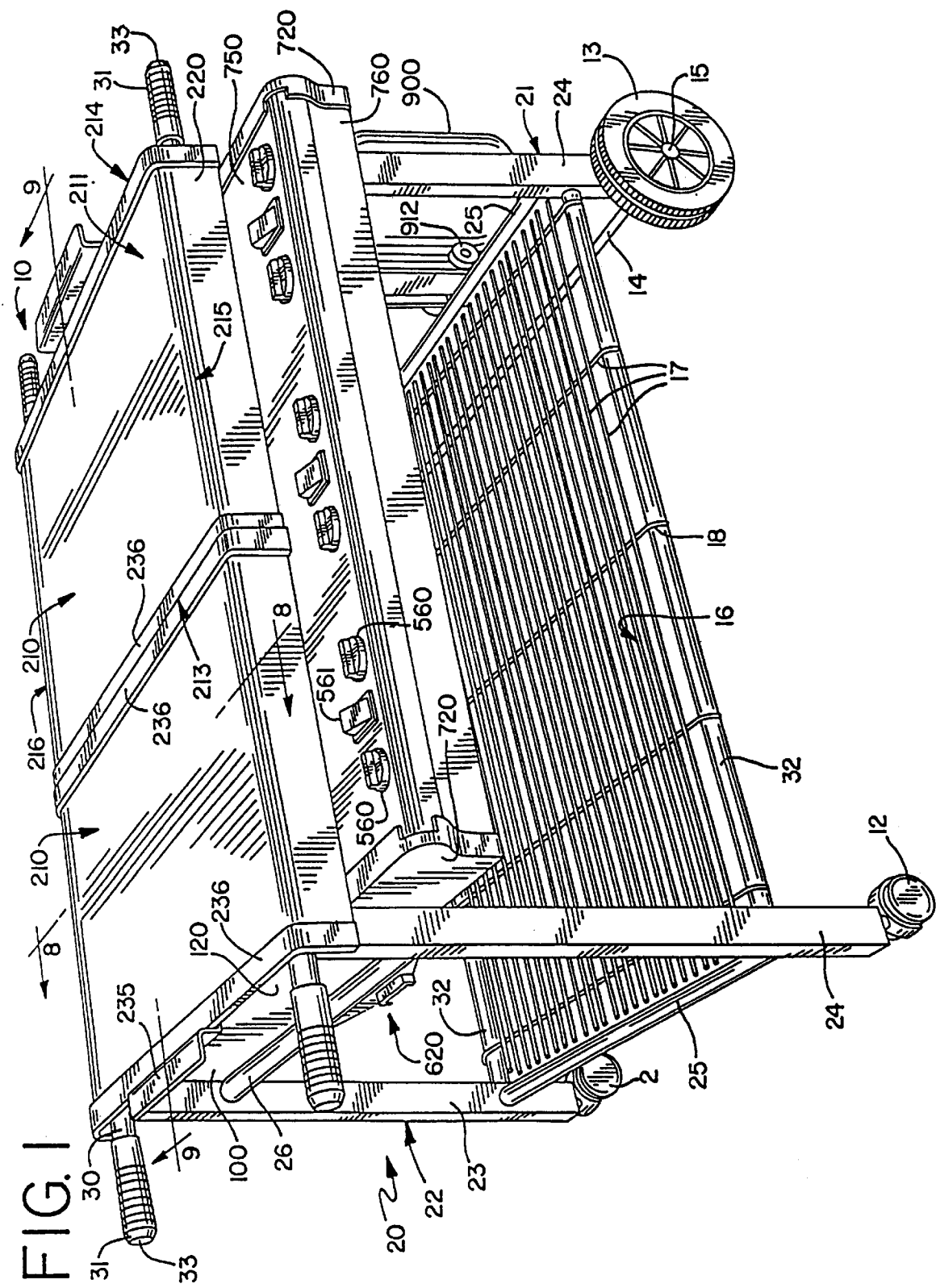
FIG. 1 is a top perspective view of a first grill embodiment made in accordance with the teachings of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

THE FIRST GRILL EMBODIMENT

The Cart Assembly

A gas barbecue grill is shown in FIG. 1, generally designated by reference number 10. The gas grill 10 is supported by a support frame, such as a cart 20, of generally rectangular configuration. The cart 20 includes two side frame members 21,22, that being a right side frame member 21 (FIG. 4) and a left side frame member 22 (FIG. 3). Each side frame member 21,22 includes two parallel, spaced apart substantially vertical posts 23,24 and two connecting, parallel, spaced apart substantially horizontal transverse posts 25,26. The components of each side frame member 21–26 are tubular, being circular or rectangular in cross-section and hollow, and are welded together. The vertical posts 23,24 have the ends of two horizontal posts 25,26, welded to them. The horizontal posts 25,26 can also be attached by conventional fasteners to the vertical posts 23,24.

All four of the vertical posts 23,24 have upper inwardly directed rounded seats 27 (FIGS. 3 and 10) cut in their upper end. This arcuate seat cooperates and holds a substantially horizontal upper longitudinal support member 30. In particular, the two front vertical posts 24 together support a front upper longitudinal member 30 and the two rear vertical posts 23 together support a second, rear upper longitudinal member 30. The upper longitudinal members are parallel to one another and also tubular, circular in cross section. The upper longitudinal support members 30 are either welded to the vertical posts 23,24 or fastened by conventional means, i.e., nut and bolt, to the vertical posts.

Similarly, the four vertical posts further have welded to them two lower longitudinal members 32 that are parallel to the upper longitudinal members 30. The lower longitudinal members 32 are attached at points adjacent to (and at the same level as) the horizontal transverse posts 25. These lower longitudinal members 32 are preferably welded to the vertical posts 23,24, but may also be fastened by conventional means, i.e., nut and bolt, to the vertical posts.

The vertical posts 23,24 of the left side frame member 22 have casters 12 attached to the bottoms thereof, again by conventional fasteners or by inserts with attached casters that fit into the bottoms of the tubular posts. The vertical posts 23,24 of the right side frame member 21 have wheels 13 adjacent thereof that project below the bottoms of the vertical posts. Each of vertical posts 23,24 of the right side frame member 21 has a hole therein passing therethrough (not shown) adjacent its bottom for receiving a transverse axle 14. The axle 14 passes through each vertical posts 23,24 and extends an amount beyond each post for receiving a wheel 13 in the front and in the rear. The wheels 13 have central holes (not shown) for receiving the axle 14. A simple fastener, such as a pin or an axially mounted, radial gripping hubcap 15 attaches to each end of the axle 14 projecting out from the wheel 13 to secure the wheel to the axle and the vertical post 23,24. In the alternative, the full axle or projecting axle stubs can be either welded or assembled to the posts and the wheels snapped and held on to the axle or stubs.

Figure 2:
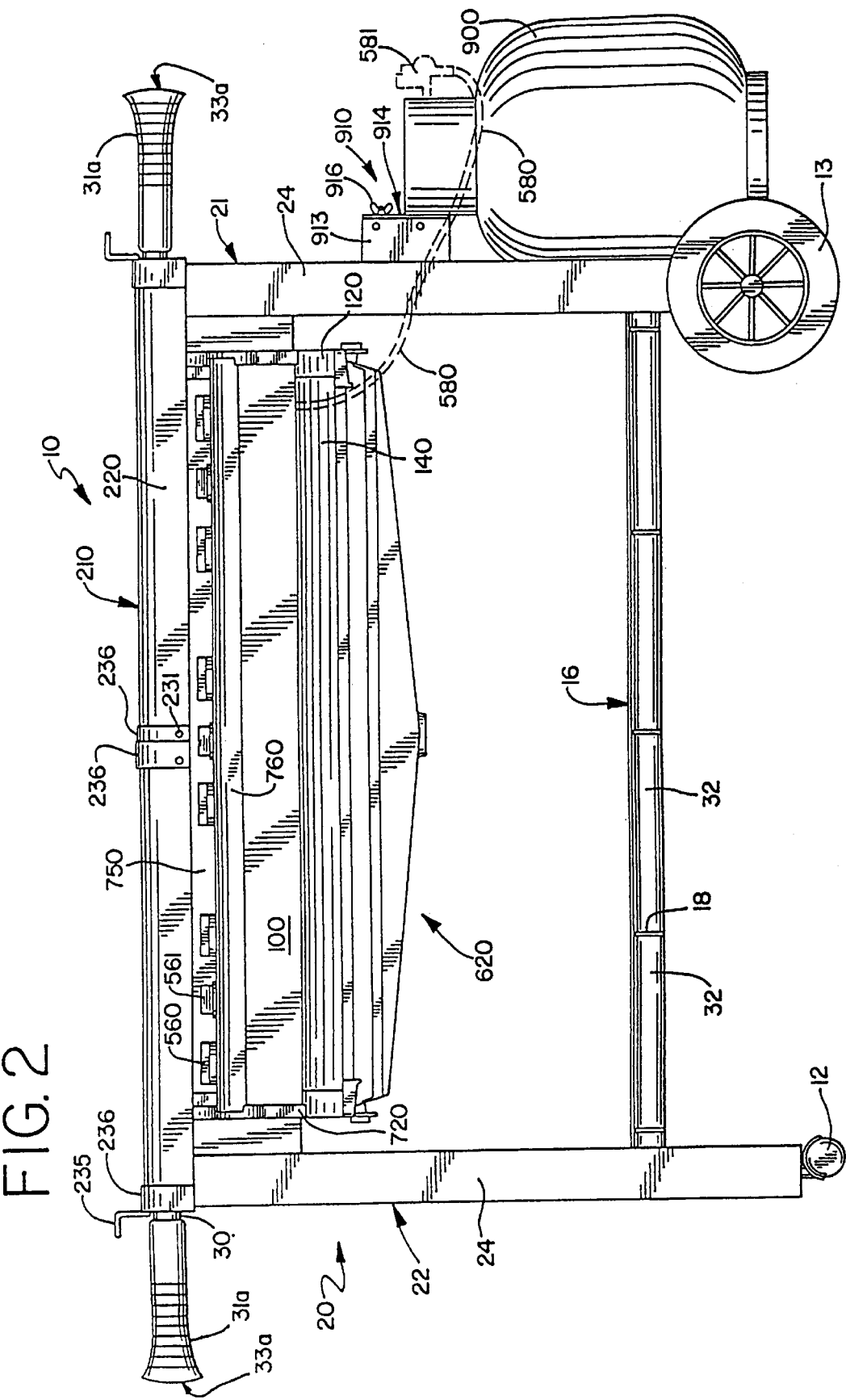
FIG. 2 is a front elevation view of the grill of FIG. 1.

A rack 16 or grid comprised of a plurality of welded, interconnected rods 17 is supported on the parallel lower horizontal transverse posts 25 and adjacent lower horizontal longitudinal members 32. In the alternative, this rack 16 can be comprised of a plurality of wooden slats, a plurality of recycled plastic slats, or a grid made from recycled plastics. This grid or rack 16 is useful as a storage rack for loose items such as, among other things, a charcoal bag, a griddle, one or more cooking grids, cooking pans and utensils. As shown in FIGS. 1 and 2, the ends of transverse rods 17 of the rack 16 have down-turned portions 18 for contacting and holding the rack onto the lower longitudinal members 32.

A firebox 100 is supported above the ground on the cart 20. The firebox 100 includes opposed longitudinal end members 140 and opposed transverse side members 120 with an opening at the top thereof. A substantially horizontal cooking grid 101 (FIGS. 8 and 9) is supported in the firebox 100.

The Sliding Covers

A pair of sliding substantially flat covers 210 cover the top of the firebox 100. Each cover 210 has an external surface 211 and an internal surface 212, an inner 213 and an outer 214 transverse edge, and a front 215 and rear 216 longitudinal edge. The two covers 210 are longitudinally slidable between an open position and a closed position. The figures show the covers in the closed position. This is represented in FIG. 5 where the Arrows A show the course or direction of the covers 210. The covers, shown in the closed position, may be opened so that their inner transverse edges 213 align with the dashed line represented by the reference letter X. In the open position, the top of the firebox 100 and the cooking grid 101 are exposed and the inner transverse edges 213 of the covers 210 are generally above the side members 120 of the firebox 100; in the closed position, the opening at the top of the firebox 100 is covered and the inner transverse edges 213 of the covers 210 are generally above the transverse center of the firebox 100, namely at a median position between the side members 120 of the firebox.

Figure 10:
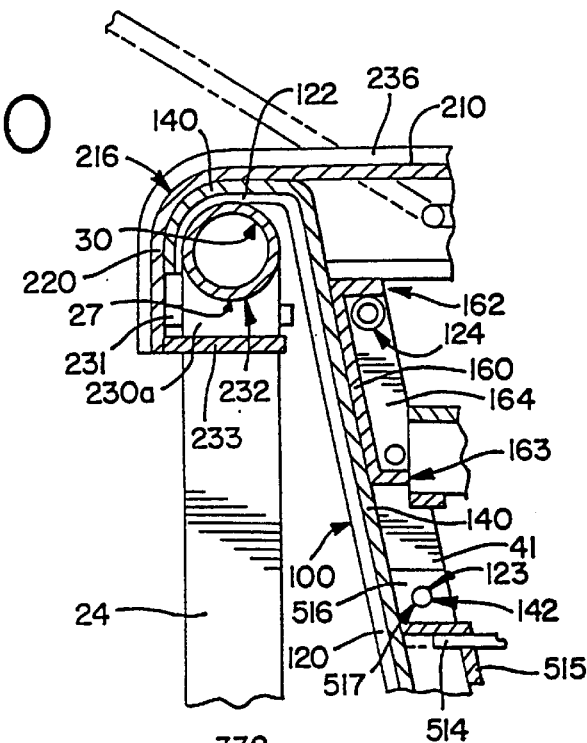
FIG. 10 is a detail sectional view of the cover sliding mechanism.
Figure 11:
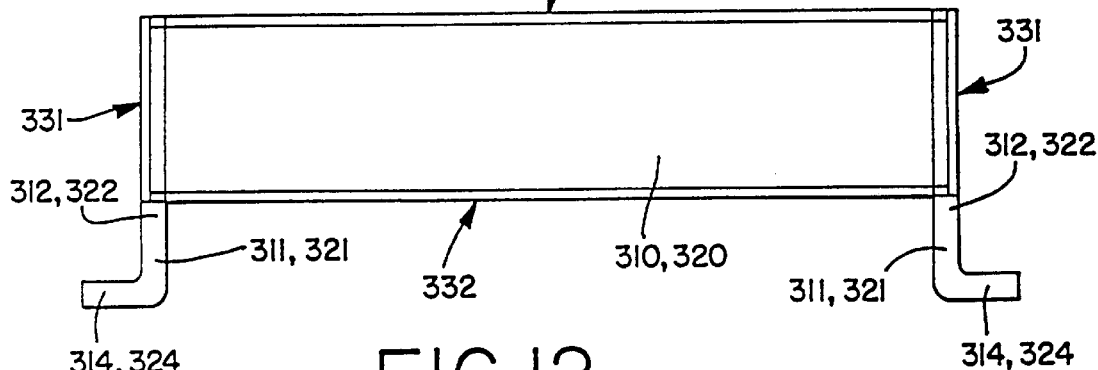
FIG. 11 is an end elevation view of a cooking guard.
Figure 12:
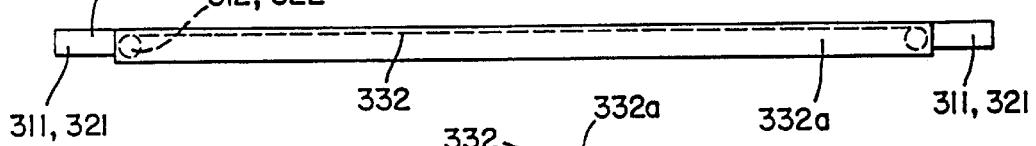
FIG. 12 is a top plan view of a cooking guard.

Turning to FIGS. 8 and 10, each cover 210 includes opposed vertical end flanges 220 projecting downwardly from the front and rear longitudinal edges 215,216 of each cover. Each end flange 220 supports along its length a substantially horizontal glide 230. This glide 230 is fastened by a fastener 231 to the end flange 220. The glide 230 is a smooth, hard rigid plastic in the form of a freely rotating roller 230 (FIG. 8) or a block 230a (FIG. 10), both with an inwardly directed arcuate top glide surface 232. Consequently, the covers 210 slide on the upper longitudinal members 30 and the glides 230 contact a bottom surface of the upper longitudinal members. In addition, in an alternative embodiment, wherein a block 230a is attached to the end flange 220 (FIG. 10), the end flange has an inwardly projecting, substantially horizontal distal flange 233 with each glide resting on a distal flange.

The bottom surface or an end surface of each upper longitudinal member supports a stop or bumper (not shown) that engages either the distal flange, end flange, or the glide of one end of the cover to stop further movement of the cover. In the alternative, the vertical posts 23,24 will act as a stop or a bumper for the glides 230 or blocks 230a. Thus, as the covers are slid from the closed position to the open position they will be prevented from sliding beyond the upper longitudinal members 30 and separating from the cart 20.

The upper longitudinal members 30 further include side extensions for permitting insulated plastic or rubber handles 31 to slip thereover for gripping and maneuvering the cart 20. While the ends 33 of the handles 31 are shown to be tapered inwardly, towards the center of the longitudinal member 30 (FIG. 1), the ends 33 may also be tapered outwardly. This alternate handle construction is shown in FIG. 2 and identified with reference numbers 31a and 33a. It has been found that the handles 31a of the second embodiment with the flared end 33a support the covers 221 when the covers are opened. Consequently, when the covers 210 are spread open, they will not droop as a result of their weight; instead, they 210 will stay level and horizontal. This added support is also helpful when the covers are used as a work surface and downward pressure or force is placed on them.

In addition, insulated cover handles 235 may be secured to the outer sides of the covers to assist in sliding the covers open or closed. As mentioned, the covers are also substantially planar and flat. They are also porcelainized metal, with insulated side guards 236 covering and protecting the inner and the outer transverse edges 213,214. The side guards 236 are constructed so that one fits under the other; one guard 236 tucks under the other guard 236. The guards 236 nestle or overlap. This prevents water (rain) and other liquids from falling into any crack between the guards that would be present if they merely abutted one another.

As just noted, one or both of the covers can be used as a work surface. Because the covers are separate, one or both can be opened or closed. A cover can be used as a work surface, e.g., preparing food, either when it is in the open position or when it is in the closed position and the burners (discussed later) underneath it are off. Thus, if a user wants to use only the burners on the left side of the grill, only the left side cover needs to be slid open. The right cover can remain closed and used as a work surface.

The Cooking Guards

The gas grill further includes one or more elongated rectangular cooking guards 310 (front guard),320 (rear guard). (FIGS. 8 and 11–17). The guards 310,320 are positioned for preventing grease from spattering onto an individual or item positioned in front of or behind the firebox 100. The guards may also be used to support tools or utensils while idle between cooking activities. Each guard 310,320 is substantially planar, devoid of holes therein, and has opposed side edges 331 and opposed end edges 332. Each guard 310,320 is pivotally further connected to the firebox 100 and adapted for movement between a guarding position (shown in dashed lines in FIG. 8) and a non-use position (shown in solid lines in FIG. 8).

In practice, both guards 310,320 are configured and work like the rear cooking guard 320. A second embodiment of the guards is shown and described in the exemplification of the front cooking guard 310.

In the guarding position, the front guard 310 projects upwardly and outwardly beyond the front end member 140 of the firebox 100. The front guard 310 rests on the upper edge of the firebox 100 and the leading end edge 332 of the front cooking guard 310 is disposed above and frontwardly of the cooking grid 101. As a result, the plane of the cooking guard makes an obtuse angle (Angle D in FIG. 8) with the cooking grid 101. Similarly, in the guarding position, the rear guard 320 projects upwardly and outwardly beyond the rear end member 140 of the firebox 100. The rear guard 320 rests on the upper edge of the firebox 100 and the leading end edge 332 of the rear cooking guard 320 is disposed above and rearwardly of the cooking grid 101. As a result, the plane of this cooking guard 320 makes an obtuse angle (Angle C in FIG. 8) with the cooking grid 101. When the cooking guards are in the un-used position, the guards 310,320 are in the firebox 100, covering a portion of the cooking grid 101 and resting on the cooking grid.

The cooking guards 310,320 each includes a pair of downwardly projecting pivot pins 311,321. Each pivot pin 311,321 is attached adjacent a side edge 331 of the cooking guard 310,320 and each pivot pin further has a section 312,322 parallel to the side edge 331 and a bent extension 313,314,324 therein. Each bent extension 314,324 cooperates with and fits into an aperture 121 formed in a side member 120 of the firebox 100 adjacent the firebox opening.

Figure 13:
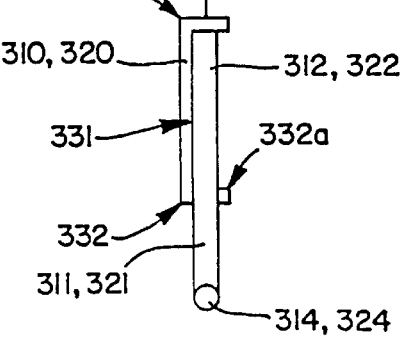
FIG. 13 is a side elevation view of a cooking guard.

As shown in FIG. 13, the end edges 332 of the cooking guards 310,320 further have parallel flange portions 332a and the pivot pins 311,321 are connected, via welding or notches formed in the pins and apertures formed in the flange portions 332a, along the side edges 331 of the cooking guards. The side edges can also have flanges therein.

In the first embodiment (FIGS. 12, 13, 14 and 15), in the guarding position (FIG. 8), the rear guard 320, projects upwardly beyond the rear end member 140 of the firebox 100 and the angle the plane of the rear cooking guard makes with the cooking grid is approximately just greater than 135 degrees (Angle C in FIG. 8). This is accomplished by merely having the bent extension 324 normal to the parallel section 322 and the positioning of the aperture 121 formed in the side member 120. In the second embodiment (FIGS. 12, 13, 16 and 17), in the guarding position (FIG. 8), the front guard 310, projects upwardly beyond the front end member 140 of the firebox 100 and the angle the plane of the front cooking guard makes with the cooking grid is approximately just greater than 90 degrees (Angle D in FIG. 8). This is accomplished by forming an additional bent section 313 in the parallel section 312 in the pivot pin 311 of approximately 135 degrees (Angle B in FIG. 17) and again the positioning of the aperture 121 formed in the side member 120. The bent extension 314 is also normal to the parallel section 312 and additional bent section 313.

The Firebox Side Members and End Members

Noted previously, the firebox 100 is supported by the upper longitudinal support members 30 and has opposed longitudinal end members 140 and opposed transverse side members 120. An opening is at the top thereof, a horizontal cooking grid 101 is therein and a plurality of burners 510 are therein. The two side members 120 are cast aluminum metal and the two end members 140 are porcelainized sheet metal. The end members are attached to the side members, which will be discussed in detail later.

The firebox 100 and the burner assembly are constructed at the factory along with the side frame members 21,22. The consumer merely completes the assembly of the cart 20 and hangs the firebox 100 on the cart. Specifically, the side members 120 have opposed outwardly projecting hooks, arms, or hangers 122 adapted for engaging the upper longitudinal support members 30 and for permitting the firebox 100 to hang between the upper longitudinal members. Thus, the firebox 100 is hung on the upper longitudinal support members 30 in the opening between the longitudinal upper members and the upper horizontal transverse posts 26.

As to the construction of the firebox 100, the side members 120 include a plurality of receptacles 123 along the edge thereof and the end members 140 have side flanges 141 with a plurality of apertures 142 therein. The apertures 142 in the side flanges 141 of the end members 140 align with the receptacles 123 in the side members 120 for permitting a fastener (not shown) to pass through each aperture into a receptacle. Appropriate fasteners include rivets and/or bolts. When the end members 140 are attached to the side members 120, a lower slot 610 is created between the end members for permitting grease to pass therethrough.

Figure 20:
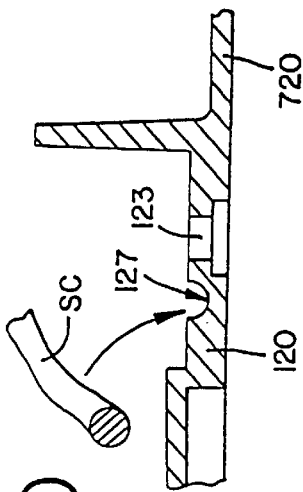
FIG. 20 is a sectional view of the side member along line 20—20 in FIG. 19.
Figure 19:
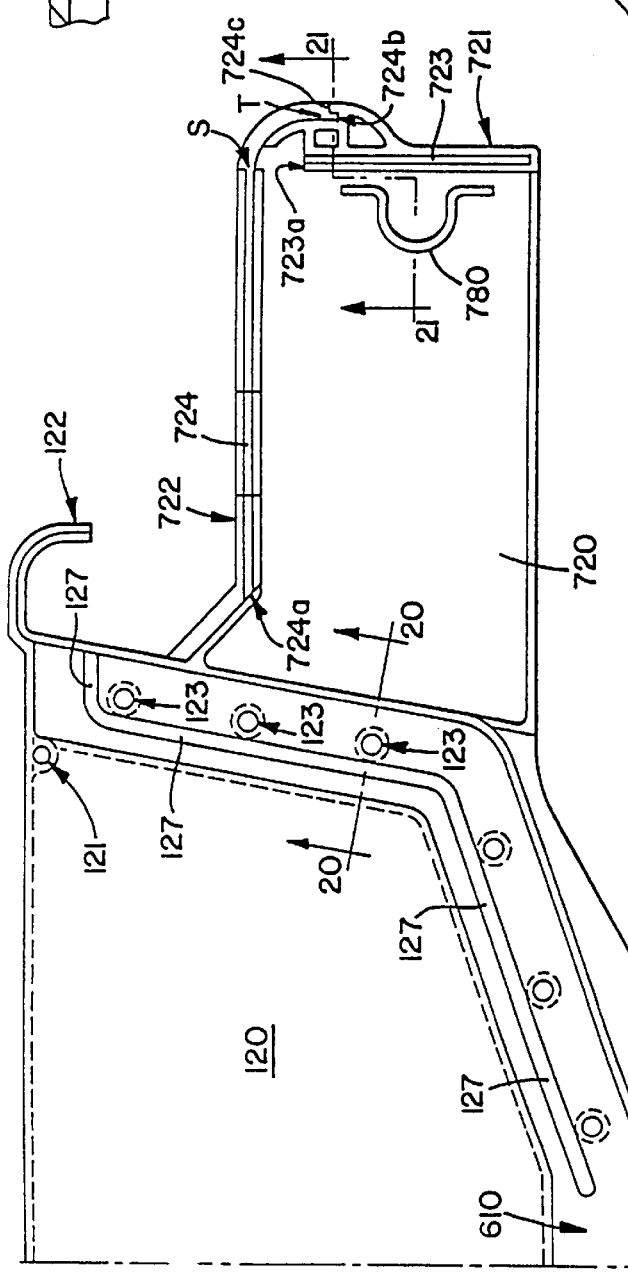
FIG. 19 is a partial side elevation view of a side member.

An internal trough 127, shown in FIGS. 19 and 20, is formed in the side members 120 generally spaced from and parallel to the perimeter or edge of the side member. A silicone cord (shown schematically in FIG. 20 and identified with SC) is placed into this trough 127. The cord is substantially round in cross-section and acts as a string washer and gasket between the fastened together end members and side members.

In addition, as shown in the sectional views of FIGS. 8 and 10, the upper ends of the end members 140 may be bent to cover and protect the upper longitudinal support members 30. This can similarly be accomplished by using a separate piece of metal.

The Support for the Grid and the Sear Bars

Each cast side member 120 includes two horizontally spaced apart inwardly projecting protuberances 124. These protuberances 124 are in the form of relatively short, inwardly directed cylinders. In the alternative, they 124 can be L-shaped brackets bolted to the side member 120. Each protuberance 124 is generally adjacent (below) the top of the side member 120 and the opening in the firebox 100. Each 124 is also collinear with the receptacles 123 and adjacent an end member 140. Or, in the case where the protuberances 124 are L-shaped brackets, the brackets are fastened (bolted) in the receptacles 123 (FIG. 19). The protuberances 124 support two opposed U-shaped supports 160. (FIGS. 8–10 and 18). The U-shaped supports 160 hold the substantially horizontal cooking grid 101 and the sear bars 410 spaced below and substantially parallel to the cooking grid. Each U-shaped support has opposed sides 161 and an upper ledge 162 and a lower ledge 163 with a base portion 164 disposed therebetween. The U-shaped support 160 is oriented in the firebox 100 with the upper and lower ledges 162,163 being substantially horizontal and the base portion 164 being substantially vertical. This base portion sits adjacent the end members. Each side 161 of the upper ledge 162 of the U-shaped support 160 rests on a protuberance 124 attached to one of the side members 120 as shown in FIGS. 8, 10 and 18. Consequently, opposed protuberances 124, one attached to each side member 120 support the opposed sides 161, specifically the opposed upper ledges 162, of each U-shaped support 160. And, the protuberances 124 attached to the left side member 120 support the left sides 161 of the two facing U-shaped supports 160; the protuberances 124 attached to the right side member 120 support the right sides 161 of the two facing U-shaped supports 160. The cooking grid 101 is thus seated on the upper ledges 162 of the opposed U-shaped supports 160 facing one another. The parallel V-shaped sear bars or FLAVORIZER® bars 410 between the burners 510 and the cooking grid 101 are seated on the lower ledges 163 of the two facing U-shaped supports 160. The lower ledge 163 of each U-shaped support 160 further includes spaced apart seats 165 adapted for seating the V-shaped sear bars 410 in spaced relation to one another.

The incorporation of the U-shaped supports 160 into the system makes assembly and disassembly of the various components in the firebox 100 very easy. As a result, cleaning the firebox and the numerous components associated with it is uncomplicated and simple. One merely removes the cooking grid, the sear bars, and the U-shaped supports and one has basically complete and easy access to the interior of the firebox and the burner assembly. To reach normally difficult places inside the firebox, complicated manipulating and maneuvering is unnecessary. The removed components can also be easily cleaned and simply reassembled.

The Burners

The grill 10 further includes a gas burner 510 in the firebox below the sear bars 410 in the form of one or more pairs of elongated parallel burner units 510. In the embodiment shown, FIG. 9, three pairs of burner units, or burner tubes, 510 are shown. Smaller units have two pairs of burner tubes 510 and larger units have eight pairs of burner tubes 510. The burner tubes 510 are connected to a fuel tank 900 by a regulator 581 and fuel line 580, shown as double dashed lines in FIG. 2.

Each burner tube 510 has two ends 511,512, a plurality of spaced apertures 513 therein, a flattened portion 514 at one end and at the other end means for controlling the fuel into the unit 510 and means for igniting the gas. The flattened portions 514 of all the burner tubes 510 are connected to a longitudinal brace 515 that is connected at each side to a side members 120. In particular, the longitudinal brace 515 has at each side thereof a flange 516 (FIG. 10) with a hole 517 therein for receiving a fastener connecting the flange to the side member 120. The hole 517 is aligned with an aperture 142 in the side flange 141 of the end member 140 and with a receptacle 123 in the side member 120. The fastener (not shown) thus passes through the hole 517 and aperture 142 into the receptacle 123. Again, appropriate fasteners include rivets and/or bolts.

Each pair of parallel burner tubes 510 is connected by and in communication with a pilot tube 530 adjacent the flattened end 511 of the coupled burner tubes so that one of the pair of burner tubes may be ignited and the other of the pair of burner tubes is ignited from the pilot tube 530. The details of the pilot tube are described in U.S. Pat. No. 4,677,964, owned by WEBER-STEPHEN PRODUCTS CO. and incorporated herein by reference.

The end 512 of at least one of the burner tubes 510 of each pair of burner tubes is connected to a control valve 540, a gas manifold 541, and an ignitor (not shown) for controlling the flow of gas into the tubes 510 and for igniting the pair of burner tubes. Adjacent the control valve is an inlet for air 542 and a venturi 543 for mixing the air and gas entering the tube 510. In the embodiment shown, there is one control valve 540 controlled by a rotatable knob 550 for each tube 510 and one ignitor for each coupled pair of tubes controlled by a push button 561.

The manifold 541 carrying gas to the burner tubes is connected to the fuel line 580 (FIG. 2), a regulator 581 and fuel tank 900.

While not shown, the burner tubes and ignitors are also assembled with ignitor housings for protecting the gas ignitors (U.S. Pat. No. 4,941,817) and burner guards for preventing spiders from entering the burners (U.S. Pat. No. 4,829,978).

Figure 9:
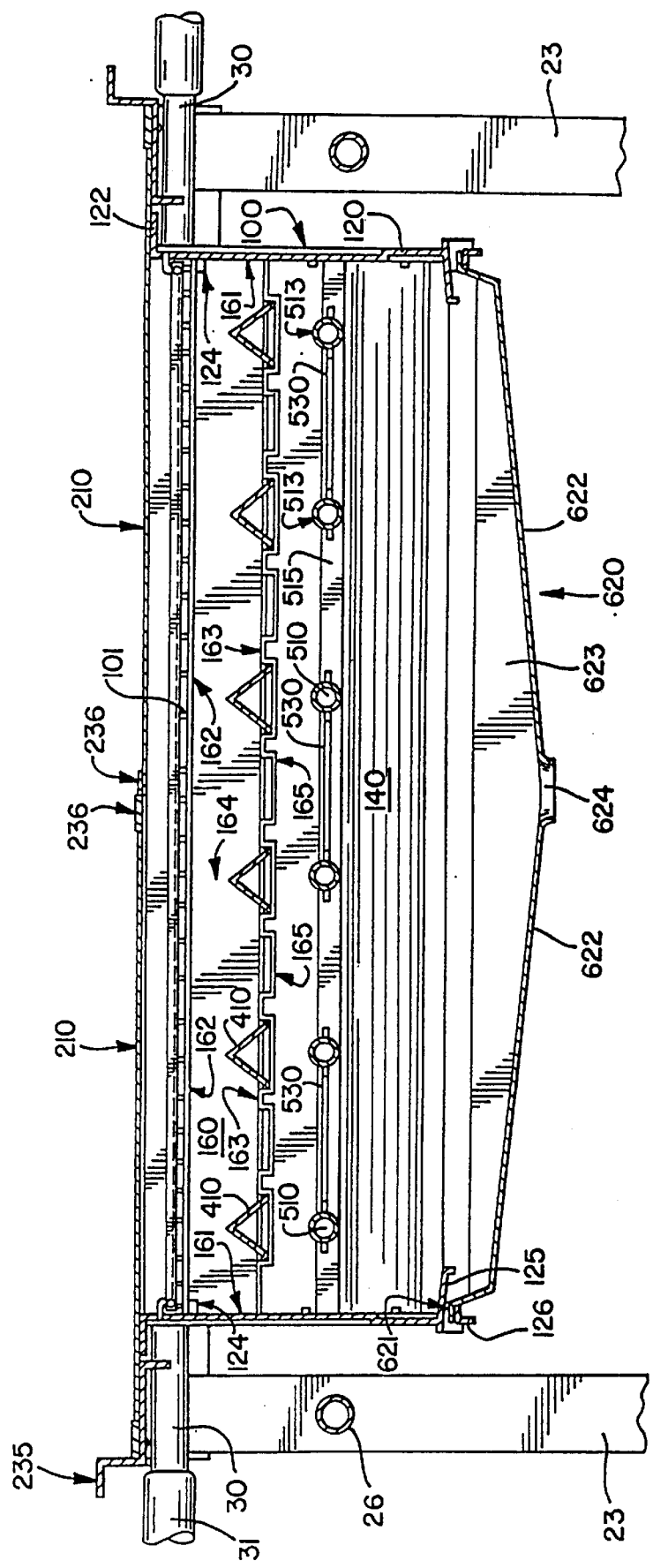
FIG. 9 is a partial sectional view along line 9—9 in FIG. 1.

Referring again to FIG. 9, at least one V-shaped sear bar or FLAVORIZER® bar 410 is seated directly above each burner tube 510. Grease can thus flow down the elongated inverted V-shaped sear bar 410 resulting in smoke for flavorizing any food on the cooking grid 101. In addition, the sear bars 410 minimize the possibility of undesirable flare-ups caused by dripping grease and protect the burner tubes from the falling grease and any build up thereon. The details of the sear bars are discussed in U.S. Pat. Nos. 4,677,964 and 4,727,853, both owned by WEBER-STEPHEN PRODUCTS CO. and incorporated herein by reference. Each sear bar 410 is created of a heat conductive material, such as cold-rolled steel or stainless steel, which may also have a porcelain enamel coating thereon (porcelainized metal) resulting in inclined grease-evaporating surfaces extending generally parallel to the burner unit 510. The inclined surfaces of the sear bars are smooth resulting in the drippings flowing down the inclined surfaces. While only sear bars positioned above the burner tubes are shown in FIG. 9, sear bars are also positioned between the burner tubes. The lower ledge 163 of the opposed U-shaped support 160 has spaced apart seats 165, again as shown in FIGS. 9 and 18, adapted for seating the V-shaped sear bars 410 in spaced relation to one another both directly above each burner tube and between the burner tubes.

The Front Extensions of the Side Members

Figure 21:
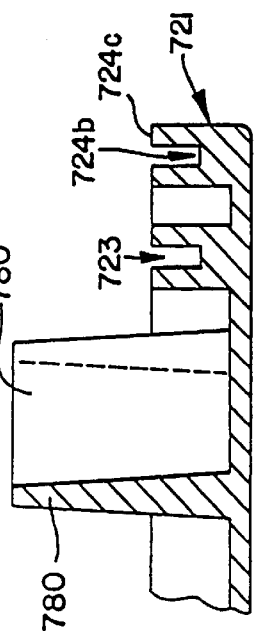
FIG. 21 is a sectional view of the side member along line 21—21 in FIG. 19.

The cast side walls or members 120 of the grill 10 of the present invention also includes two co-planer extension pieces 720, one extension piece per side member. FIGS. 19–21 show the details of these extension pieces. These opposed side extension pieces 720 each have a front edge 721 and top edge 722 and an upper channel or groove 724 therein along the top edge and a front channel or groove 723 therein along the front edge. A top face plate 750 having opposed sides slides into the two opposed upper channels 724 and is slid, locked and held at each side in one of the upper channels 724 of the extension piece 720 of a side member 120. Similarly, a front face plate 760 having opposed sides slides into and is locked into the two front channels 723 and is held at each side in one of the front channels 723 of the extension piece 720 of a side member 120.

In particular, with respect to the top face plate 750 and referring to FIG. 19, the end of each side of the face plate is fed into the top groove 724, as shown by Arrow S. The side is fed until it hits the end wall 724a. The unfed portion and unfed end of the face plate 750 naturally deflects up. This unfed end is then placed in the pocket 724b formed adjacent the front edge 721 of the extension 720 (Arrow T). The detent or lip 724c of this pocket 724b prevents the top face plate 750 from springing out of the channel or groove 724,724a,724b. Or, if formed with a curve, the top face plate 750 sits in the groove 724,724a,724b in a relaxed state. With both sides threaded, the top face plate 750 is locked between the two opposed extensions 720.

As to the front face plate 760, one end is bent creating a lip 761 (FIG. 8). Each end of the face plate 760 can thus be fed into the front groove 723. The lip 761 will then rest on the upper edge 723a (FIG. 19) of a wall of the groove 723.

Both the front face plate and top face plate protect the burner assemblies from rain. The two face plates further keep rain from running down the front panel into the grease collector 620 and grease tray. Moreover, there is a slight overlap (marked W in FIG. 8) between the front face plate 760 and the top face plate 750 to prevent dirt and rain from entering the area between the face plates.

As seen in FIG. 8, the top face plate 750 has apertures 751 therein for receiving controls 560 for the burners 510 of the grill 10 and for controls 561 for igniting the burners. In the embodiment shown, there are six (6) control knobs 560 for the burner tubes 510 and three (3) ignitor buttons 561 for the three pairs of burner tubes. In addition, the preferred embodiment, the top face plate and the front face plate are porcelainized metal.

Figure 22:
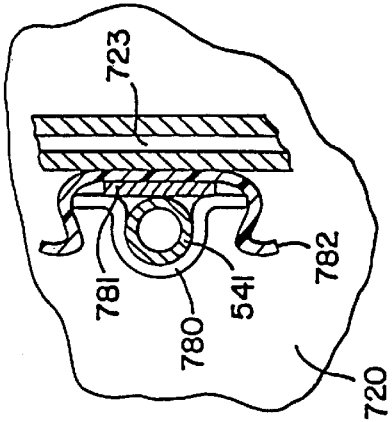
FIG. 22 is a detail of the manifold connection.

With reference to FIGS. 8, 19, 20 and 22, the side member extensions 720 also support the manifold 541 connecting the fuel line 580 to the burner tubes 510. The manifold runs between the extensions 720 from side to side. An omega-shaped wall 780 is cast into each extension 720. A small rectangular plank 781 is also welded to each side of the manifold 541. Each side of the manifold 541 is placed into the omega-shaped wall 780 with the plank 781 facing outwardly as shown in FIG. 22. A contoured spring clip 782 is then forced between the plank 781 and a wall of the front channel 723. When released, the clip 782 holds the manifold 541 in each of the contoured arcuate walls 780 shaped like an omega.

The Grease Collector

FIG. 8 shows a sectional view of the end members 140, which are inwardly tapered 143 forming a ramp leading to a lower gap or slot 610 created between the end members. These inwardly directed ramps 143 permit grease to flow downwardly thereon towards the slot. A removable grease collector 620 is positioned below this lower slot 610 for collecting the grease run-off. Both the side members 120 have an inwardly projecting deflectors 125 (FIG. 9) also for directing grease to the lower slot 610. Also shown in FIG. 9, each side member 120 further includes an inwardly projecting shelf 126 spaced below the deflector 125 for supporting an upper, outwardly projecting lip 611 at a side of the grease collector 620. Opposed inwardly projecting shelves 126 formed into the side members 120 support the two, opposed outward lips 621 of the grease collector 620. As a result, the upper lips 621 can be slid off and on to the inwardly projecting shelves 126 and hence, the removable grease collector 620 can be slid off and on the bottom of the firebox 100. This permits easy cleaning of the grease collector.

The grease collector 620 further includes inwardly tapering walls 622,623 leading to a lower opening 624 therein. Below this opening 624, a smaller, removable grease collector tray or collector (not shown) is supported by means of a conventional bracket or holder. Such a support means can be a wire assembly, as the one shown and described in U.S. Pat. No. 4,677,964, owned by WEBER-STEPHEN PRODUCTS CO., which is incorporated herein by reference. Finally, the removable grease collector 620 is preferably made of porcelainized metal.

The Shields

With reference to FIG. 6, a heat shield 810 is secured to the rear vertical posts 23 by fasteners connected to the sides of the shield for both protecting individuals and items from direct contact with the upper portion of the firebox 100 and protecting the firebox from rain and debris. A similar heat shield may also be attached to the front vertical posts 24.

The Fuel Tank and the Tank Scale

The gas grill also incorporates a tank-support means 910 for a fuel tank 900. The tank-support means 910 is located on one side of the cart 20, that being the right side frame member 21, between the vertical posts 23,24 on the right side of the cart. The tank 900 is supported directly above the wheels 13. The tank-support means 910 includes a vertical brace 911 that is configured at its top for wrapping around a portion of and hanging from the upper horizontal transverse post 26. The brace 911 is thus free to rotate or pivot about the horizontal transverse post 26. Alternatively, the brace 911 can be welded or bolted to the transverse post 26. This brace 911 is U-shaped in cross section (FIG. 1). Two small, freely-rotatable wheels 912 are attached adjacent the bottom of the brace 911 for contacting the tank. These wheels 912 dampen any friction the fuel tank 900 cause by its being put on to the assembly, taken off the assembly or while supported on the assembly. Specifically, the tank 900 will also move as its fuel is consumed relative to the brace 911. The wheels 912 assist this necessary relative movement. A tank scale box 913 is attached to the outer surface of the vertical brace 911. And, a tank bracket 915 is attached by a fastener 916 to a cover element 914 interconnected to the tank scale box 913. The tank bracket supports the tank 900 by engaging an aperture formed in the top of the tank for carrying the tank. As the tank's fuel is consumed, the weight of the tank 900 is reduced, resulting in movement of the tank bracket 915 and cover element 914 relative to the tank scale box 913 and in movement of the tank 900 relative to the brace 911. Consequently, the amount of fuel in the tank 900 can be gauged. The details of the tank scale box 913 and the mechanics of the scaling is discussed in detail in U.S. Pat. No. 4,677,964, owned by WEBER-STEPHEN PRODUCTS CO., which is incorporated herein by reference.

THE SECOND GRILL EMBODIMENT

This second grill embodiment is shown in FIGS. 23–36. This second grill embodiment 1010 is similar to the first grill embodiment 10. Accordingly, like components in the first embodiment will have the same reference numbers as those in the second embodiment. However, for clarity, many of these similar components in the second embodiment will neither be discussed nor referenced. For details of these components, one needs to only refer to the first embodiment.

Specific unique components, or improvements, to this second embodiment will be given a reference numbers in the 1000 series.

While shown in the figures as a portable gas grill supported on a cart, the grills 10, 1010, do not necessarily need to be on such a cart. Specifically, the support structure, the cart 20, can be a support frame of another construction, such as that of a stationary outdoor grill or a grill adapted to be within an indoor counter structure. One important similarity in the support structures is the presence of two generally horizontal longitudinal support members (30). These will be discussed in detail below.

An Overview of The General Structure

Figure 32:
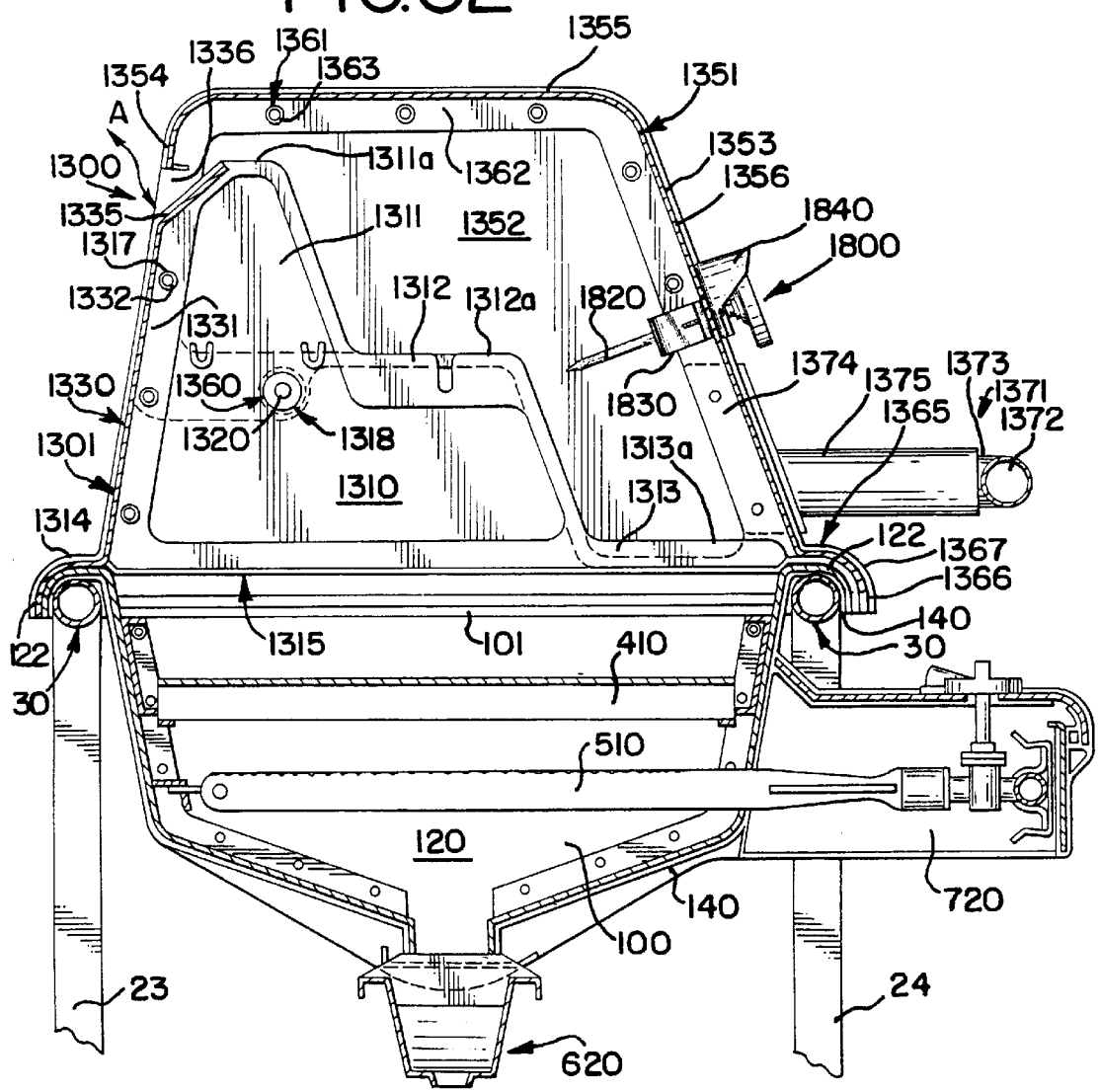
FIG. 32 is a sectional view along line 32—32 in FIG. 30 with the cover closed.

With primary reference to FIGS. 23 and 32, the grill of the second embodiment 1010 is supported by a support frame, such as a cart 20, of generally rectangular configuration. The cart 20 includes two side frame members 21,22, with each side frame member 21,22 including two parallel, spaced apart substantially vertical posts 23,24 and two connecting, parallel, spaced apart substantially horizontal transverse posts 25,26. As before, the components of each side frame member 21–26 are tubular, being circular or rectangular in cross-section and hollow, and are generally welded together.

All four of the vertical posts 23,24 are connected to substantially horizontal upper longitudinal support members 30. The two front vertical posts 24 together support a front upper longitudinal support member 30 and the two rear vertical posts 23 together support a second, rear upper longitudinal support member 30. The upper longitudinal support members are parallel to one another and also tubular, circular in cross section. Similarly, the four vertical posts are further connected to two lower longitudinal members 32 that are parallel to the upper longitudinal members 30.

A firebox 100 is supported above the ground on the cart 20. The firebox 100 includes opposed longitudinal end members 140 and opposed transverse side members 120 with an opening at the top thereof. A substantially horizontal cooking grid 101 is supported in the firebox 100. The firebox supports gas burners 510 and sear bars 410. And, the cast side walls or members 120 of the grill 1010 include two co-planer extension pieces 720, one extension piece per side member. Other components discussed above and included in this second embodiment include a grease collector 620, a fuel tank 900 and a tank-support means 910 (not shown).

The Parallel Upper Longitudinal Support Members

This second embodiment is a modular system. Numerous components of this grill can be easily hung from or supported by the horizontal members 30,32. These components include the firebox 100, a hood assembly 1300, two or more work shelves 1430, two opposed extension members 1410 and one or more storage bins 1750, each to be discussed in detail below.

As noted previously, the upper longitudinal support members 30 are spaced apart and generally parallel to one another. As shown, this permits the firebox 100 to be hung from and between the longitudinal support members 30. Preferably, the upper longitudinal support members 30 are constructed of rigid tubing, such as round pipe tubing.

The Firebox

The firebox, or cooking chamber, 100 is supported by the upper longitudinal support members 30 and has opposed longitudinal end members 140 and opposed transverse side members 120. This firebox can be entirely cast aluminum or a combination of cast aluminum and porcelainized sheet metal, the two side members 120 being cast aluminum metal and the two end members 140 being porcelainized sheet metal. Shown in FIG. 32, each of the firebox's 100 side members 120 includes outwardly projecting opposed projection hooks, arms, or hangers 122 contoured to cover a portion of the length of the one of the longitudinal support members 30 and adapted for supporting the firebox between the longitudinal support members. One projection or arm 122 extends towards the front longitudinal support member 30 and the other projection or arm 122 extending towards the rear longitudinal support member. With the firebox 100 and the burner assembly being constructed at the factory, a consumer merely completes the assembly of the grill by hanging the firebox on the upper longitudinal support members 30 of a cart, a stationary outdoor structure for a grill or an indoor counter structure for a grill. The firebox is thus hung on the upper longitudinal support members 30 in the opening between the longitudinal upper members.

The Hood Assembly

Another modular component of this grill 1010 is a hood assembly 1300 supported on the upper longitudinal support members 30. This hood assembly 1300 includes both a base assembly 1301 and a cover 1351. The base assembly 1301 is supported directly above and adjacent the cooking chamber or firebox 100 and the cover 1351, supported by the base assembly, pivots about the base assembly.

Figure 33:
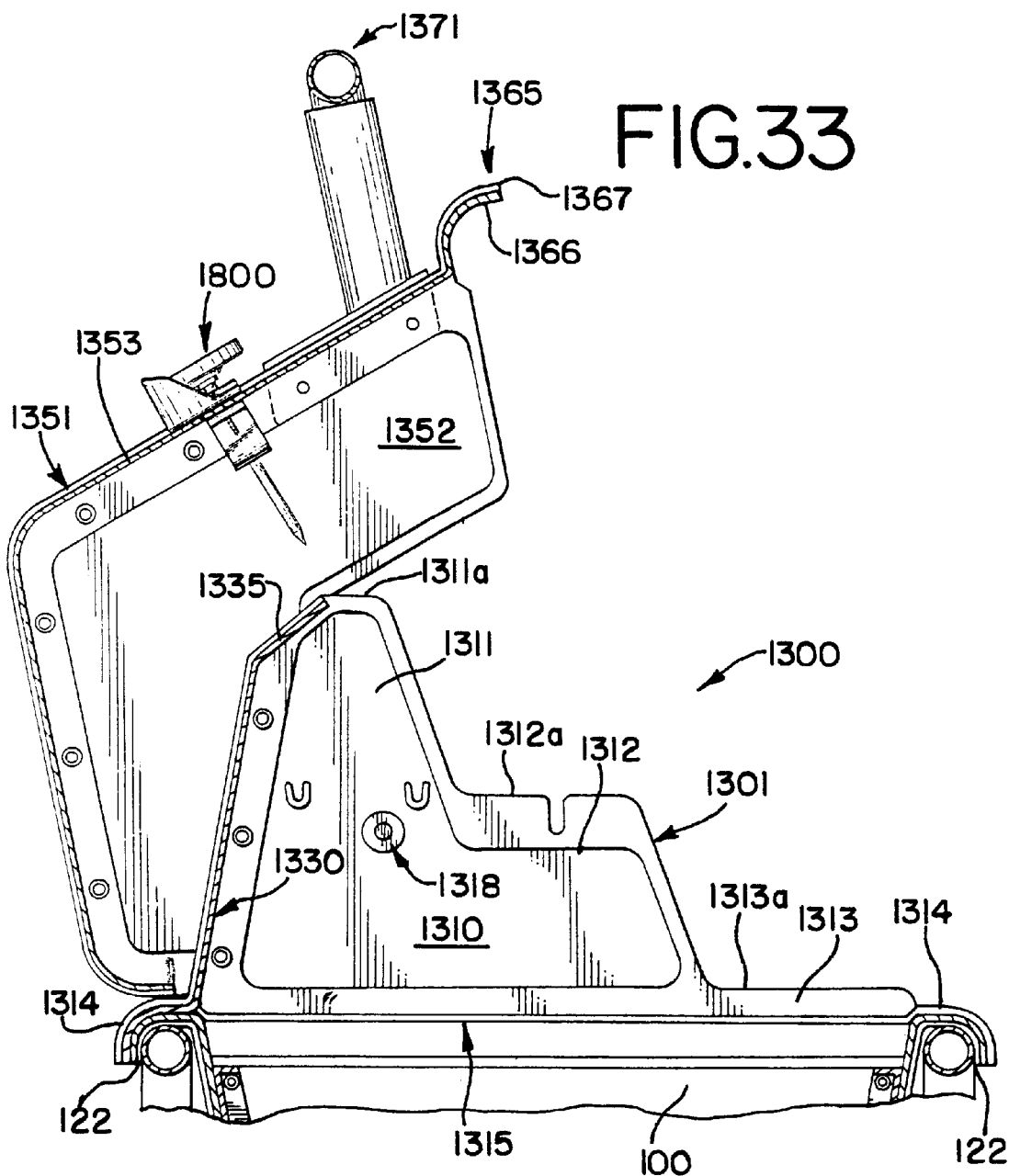
FIG. 33 is a partial sectional view along line 32—32 in FIG. 30 with the cover opened.

With reference to FIGS. 23, 32 and 33, the base assembly 1301 includes opposed side walls 1310, preferably cast metal, and a rear wall 1330, preferably porcelainized metal (metal having a porcelain enameled surface or coating thereon). The side walls 1310 have, from the rear moving forward, a first section 1311, second section 1312, a third section 1313 and opposed fingers 1314. The first section 1311 is higher (upper edge 1311a) than the second section 1312 (upper edge 1312a) and the second section is higher than the third section 1313 (upper edge 1313a). The opposed fingers 1314, like the projecting hooks/arms 122 of the firebox 100, project outwardly and are adapted for engaging a portion of the length of the upper longitudinal support members 30 and for permitting maintaining the base assembly 1301 in position above the firebox. One finger 1314 extends towards the front longitudinal support member 30 and the other finger 1314 extends towards the rear longitudinal support member. The four fingers, two for each side wall 1310, preferably extend from a bottom edge portion 1315 of the side wall 1310. These fingers are contoured to partially cover one of the longitudinal support members 30. Accordingly, the base assembly 1301 is supported by the two upper longitudinal support members 30.

To ensure the base assembly is stationary, fasteners can be used to secure the base assembly to either the firebox or the longitudinal support members.

As to the construction of the base assembly 1301, the side walls 1310 include a plurality of receptacles 1317 along the edge thereof and the rear wall 1330 has a flange 1331 with a plurality of apertures 1332 therein. The apertures 1332 in the flanges 1331 align with the receptacles 1317 in the side walls for permitting a fastener (not shown) to pass through each aperture into a receptacle. Appropriate fasteners include rivets and/or bolts.

The rear wall 1330 also includes a flap 1335, or bent portion, angled towards the front of the unit. The flap 1335 cooperates with the cover 1351 to form a vent 1336 for smoke or air (A). (FIG. 32).

A channel 1318 in the first section 1311 receives and holds a pivot pin 1320. The channel 1318 is positioned adjacent the second section 1312, spaced from the rear edge and rear wall 1330. The pivot pin 1320 passes through a corresponding channel 1360 in the cover 1351. Consequently, the cover 1351 is hingably connected by two pivot pins 1320 to the base assembly 1301 at a location forwardly of the rear wall 1330 of the base assembly. Therefore, the axis of rotation of the cover 1351 is located at a central portion of the side wall 1310, forward from the rear wall 1330, and between the upper edge 1311a and the bottom edge portion 1315 of the side wall 1310. Similarly, the pivot pins 1320 connect the side walls 1352 of the cover 1351 to the base assembly 1301 at a location forwardly of the rear wall 1354 of the cover. In this manner, a user will not be lifting the entire weight of the cover when lifting the cover and rotating it about the base assembly.

The cover 1351 includes opposed side walls 1352, preferably cast metal, and a center panel 1353, preferably porcelainized metal (metal having a porcelain enameled surface or coating thereon), having a rear wall 1354, top wall 1355 and a front wall 1356.

As to the construction of the cover 1351, the side walls 1352 include a plurality of receptacles 1361 along the edge thereof and the center panel 1353 has a flange 1362 with a plurality of apertures 1363 therein. The apertures 1363 in the flanges 1362 align with the receptacles 1361 in the side walls for permitting a fastener (not shown) to pass through each aperture into a receptacle. Again, appropriate fasteners include rivets and/or bolts.

The rear wall 1354 of the center panel 1353 is relatively short in length to, as discussed previously, cooperate with the flap 1335, or bent portion of the base assembly 1301 to form a vent 1336 for smoke or air (A).

As shown in FIGS. 32 and 33, the cover 1351 further includes a front lip 1365 contoured and adapted for engaging and resting upon the front longitudinal support member 30. This lip 1365 is formed by a lip 1366 in the center panel 1353 and lips 1367 in the side walls 1352. In actuality, due to the dimensions of the firebox, the contoured front lip 1365 of the cover 1351 engages and rests upon one of the opposed projections or arms 122 covering the longitudinal support member 30. In short, the arm 122 is nestled between the lip 1365 on the cover 1351 and a longitudinal support member 30. A larger firebox would result in the lip resting on the upper longitudinal support member as opposed to the arms.

Finally, an elongated U-shaped handle 1371 having a gripping portion 1372 and two legs 1373 is attached to the side walls 1352 of the cover 1351. A bracket 1374 receives and securely connects the legs 1373 of the handle 1371 to the cover. This bracket 1374 is fastened by conventional means to the side walls of the cover. It should be noted the handle is very sturdy and rigid so as to ensure the center panel 1352 does not deform and the side walls 1352 stay parallel and do not contort. Insulated tubular channels 1375 substantially surround legs 1373 and act as guards to protect the user.

The Work Shelves and Extension Members

The grill 1010 further includes extension members 1410 secured to the ends of the upper horizontal support members 30. In the first grill embodiments, handles 31 were attached to these members 30. These extension members 1410 are tubular and U-shaped, each having a gripping section 1411 and two opposed legs 1412. The legs 1412 are dimensioned to couple with the ends of the upper support members 30. Specifically, each leg 1412 has a diameter slightly less than or greater than the diameter of the upper support members 30 permitting the leg to respectively, snugly fit within or just over the upper support members. In this manner, the extensions 1410 and the upper support members 30 are frictionally engaged or coupled. Of course, it is appreciated that the extensions can be welded to the support members and the extensions and the support members can be one piece. Further, because the opposed legs 1412 of the extension members 1410 are coupled with the ends of the upper support members 30, the result is a generally rectangular horizontal frame with a solid corner construction having no joints (or coupling) in the corners. The combination of having no coupling located in the corners and the type of coupling disclosed herein provides an upper horizontal frame structure having greater strength and structural integrity.

The extensions 1410 and the upper support members 30 further support work shelves 1430. These shelves 1430 provide a space for a user to work adjacent the firebox and hood assembly; the shelves can also be used as trays to carry objects situated thereon to or from the grill. The trays can further be easily removed for cleaning and storage. Each work shelf 1430 has a substantially flat work surface 1431 and two opposing flanges 1432 contoured to engage and rest upon an upper surface of the upper longitudinal support members 30 and/or extensions 1410 to support the work shelf between the upper longitudinal support members. In the embodiment shown, each flange 1431 is arcuate to conform to the tubular shape of either the extensions 1410 or the upper longitudinal support members 30.

While work shelves 1430 are shown adjacent the firebox/hood assembly, it should be understood that a removable side burner may also be secured to the upper support members 30 in the same manner as the work shelves.

The Storage Rack

A storage rack 1016 is supported on the parallel lower horizontal longitudinal members 32 in the same manner as the work shelves 1430. This rack 1016 provides a space for a user to store items in a vicinity near the firebox. The rack shown, in two similar pieces, can be easily removed for cleaning and storage. Each rack 1016 has a substantially flat work surface 1018 and two flanges 1017 contoured to engage and rest upon an upper surface of the lower support members 32. Thus, the rack 1016 is supported by and between the support members 32.

The Storage Bin and The Cabinets

Figure 30:
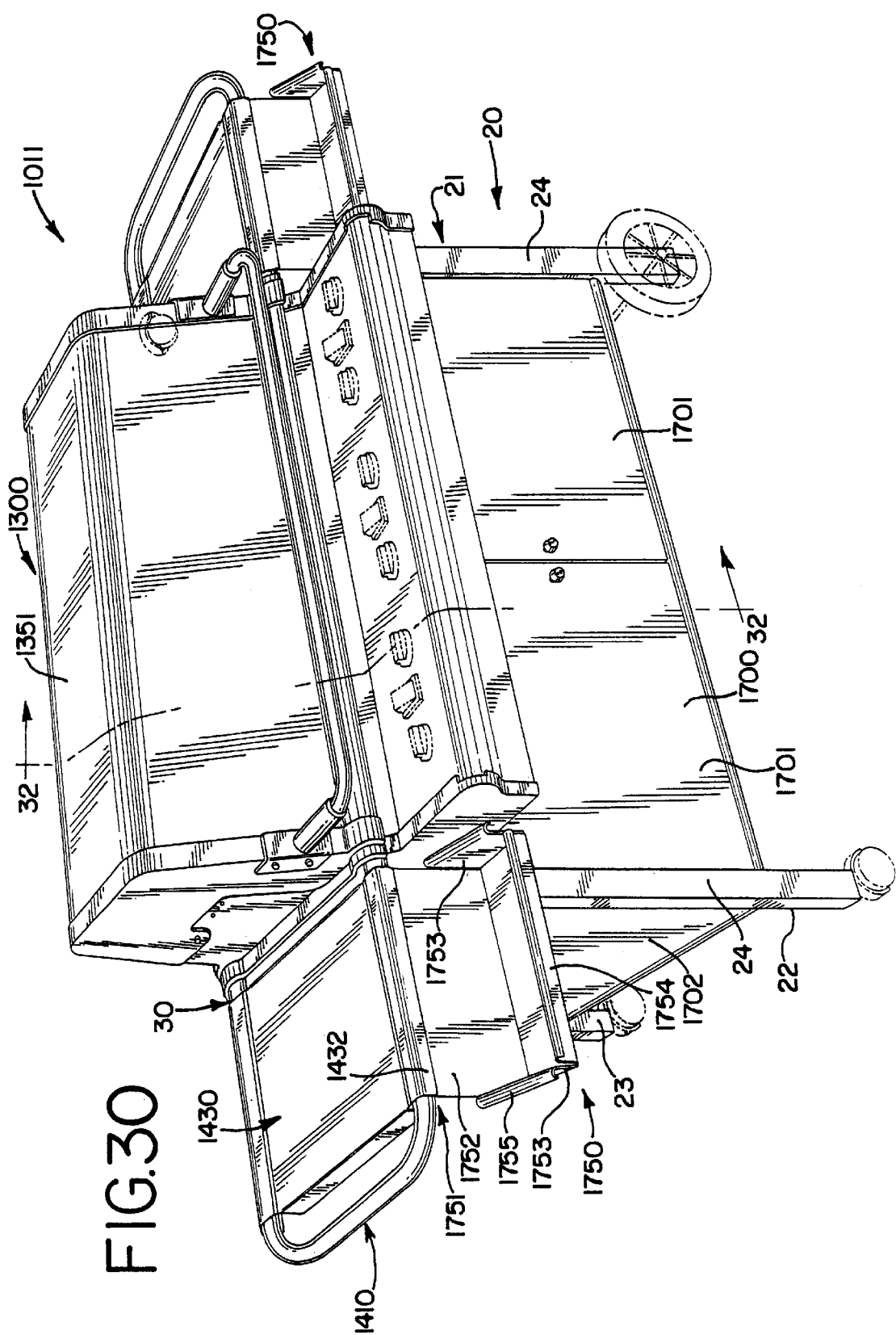
FIG. 30 is a top perspective view of a variation of the second grill embodiment made in accordance with the teachings of the present invention.
Figure 31:
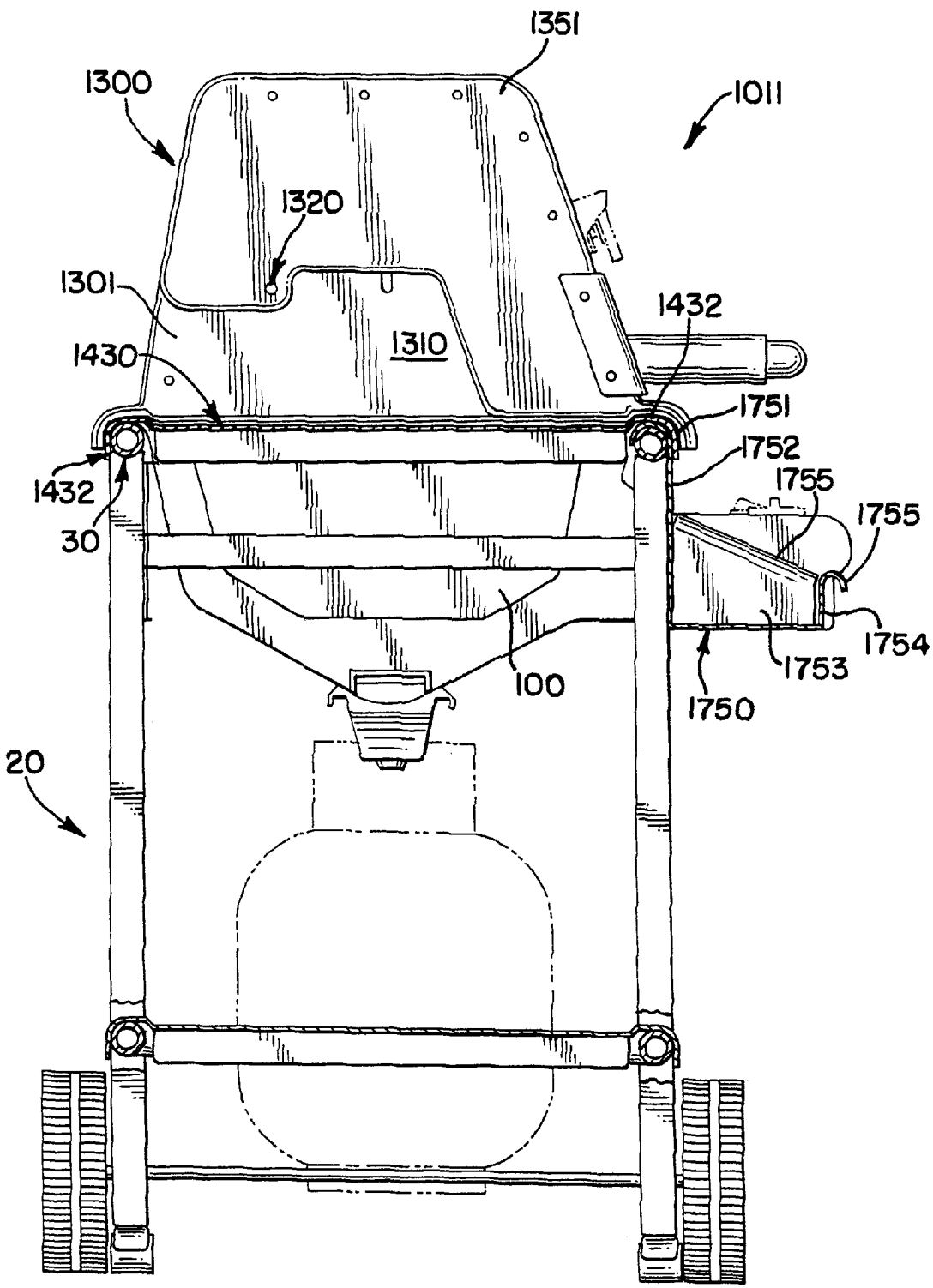
FIG. 31 is a sectional view along line 31—31 in FIG. 23.

FIGS. 30 and 31 show a grill 1011 with further enhancements to the ones just described. Specifically, this grill 1011 includes a cabinet 1700 and storage bins 1750.

The cabinet 1700 involves encasing the storage space between the firebox 100 and the storage rack 1016. Specifically, front doors 1701 are hingably attached to the horizontal members 30, 32 or 25, 26 (or to the front vertical posts 24) and side panels 1702 are attached between and to the each side frame member 21,22, that being the front vertical posts 24 and the rear vertical 23 posts. The doors 1701 have knobs for gripping and moving the doors between and open and closed position. A rear panel (not shown) disposed between and to the rear vertical posts 23 may also be incorporated into the grill 1011.

One or more storage bins 1750 are positioned adjacent the work shelves 1430 and are supported by the upper longitudinal support members 30 and/or extensions 1410. Each of these bins incorporate a flange 1751, a vertical stem 1752 and three side walls 1753,1754. The flange 1751 is contoured to engage and rest upon an upper surface of the upper longitudinal support members 30 and/or extensions 1410 to support the storage bin adjacent the work shelf. Each flange 1751 is arcuate to conform to the tubular shape of either the extensions or the upper longitudinal support members. The three side walls 1753,1754 employ lips 1755 rolled outwardly to add perimeter strength and avoid sharp edges. As shown in FIG. 30 the edges 1755 of the opposed side walls 1753 are angled downwardly to ensure stability and vertical orientation of the storage bin. While not shown, lift-off, hinged or sliding covers can used to cover these storage bins 1750. With reference to FIG. 31, the flange 1751 of the storage bin 1750 is nestled between the upper longitudinal support members 30 and/or extensions 1410 and the flange 1432 of the work 1017 of the work shelve 1430.

The Removable Thermometer

Figure 34:
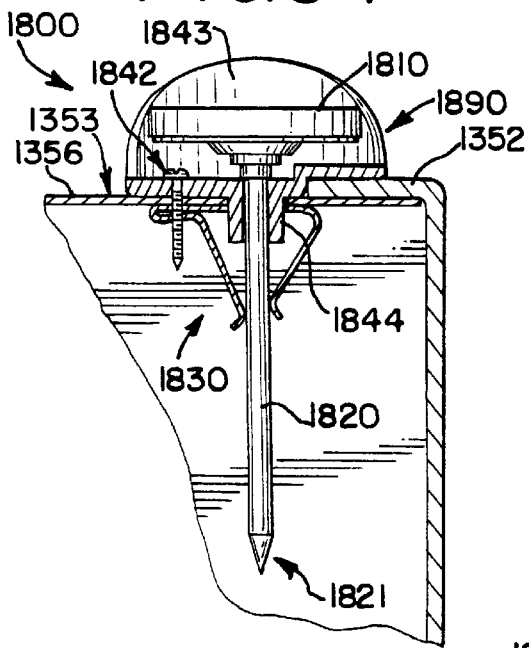
FIG. 34 is partial sectional view of the cover and the removable thermometer, thermometer bracket and thermometer sleeve.
Figure 35:
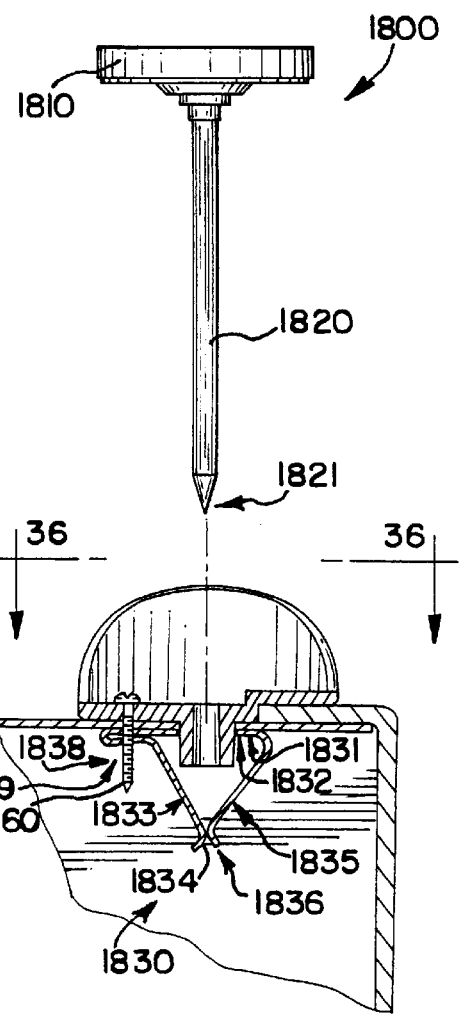
FIG. 35 is an exploded view of the cover and the removable thermometer, thermometer bracket and thermometer sleeve; and, FIG. 36 is plan view taken along line 36—36 in FIG. 35 of the cover and thermometer sleeve.
Figure 36:
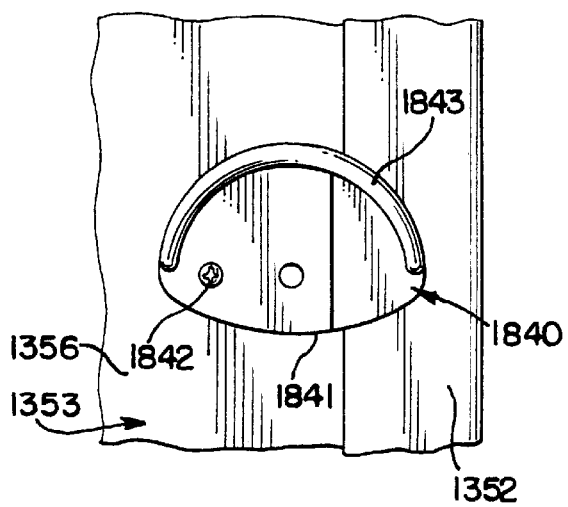

FIGS. 34–36 show the details of a novel thermometer 1800 used on the present grill. This thermometer 1800 can be used to sense the temperature inside the cooking chamber and in the food being prepared. It is easily removable and replaceable. The thermometer 1800 includes an indicator body 1810 and a probe or piercing portion 1820. As the support means or mounting assembly for the thermometer, attached to the grill, is a clip or bracket 1830 and a sleeve 1840.

The thermometer is positioned and passed through the front wall 1356 of the center panel 1353. The indicator body 1810 houses the mechanics (not shown) and/or electronics (not shown) for converting the sensed temperature to a readable format, either an analog dial or digital screen. This body 1810 is connected to one end of a probe, shaft, or piercing projection having a pointed tip 1821 at the other end.

The bracket or clip 1830 is fastened to the inside surface of a wall for the cover 1351, namely the center panel 1353 and side wall 1352 of the cover. This clip/bracket has a generally P-shape with an opening in the looped portion. Specifically, the bracket 1830 has a base 1831 with an opening 1832 therein defining a passageway and two generally opposing fingers 1833,1834 extending from the base to a distal end. The fingers 1833,1835 are directed or biased in a direction toward the passageway 1832 (FIG. 35) and have turned portions 1834,1836 at their respective distal ends. Consequently, the turned portions 1834,1836 at the distal ends of the fingers 1833,1835 must be spread apart (FIG. 34) in order to place something between them, such as a probe. When the probe 1820 is passed through the passageway 1832, the fingers 1833,1835 separate and the turned portions 1834,1836 frictionally engage and hold the probe in place. The bracket further includes an overlapping section 1838 abutting a portion of the base 1831 with a passageway 1839 therethrough defined by aligned holes in the base and overlapping section. A conventional fastener, e.g., screw 1860, passing through the aligned holes and an aligned hole in the cover secures the clip 1830 to the cover. The fingers 1833,1835 are slightly offset so that the inner-most points of the turned portions 1834,1836 do not touch one another (FIG. 35). Accordingly, the inner most points of the turned portions contact the probe at different longitudinal points on the probe.

An outer sleeve 1840 renders protection to and assistance with gripping the thermometer. In particular, an outer sleeve 1840 has a base 1841 fastened (via the same fastener 1860 used for the bracket/clip 1830 passed through a hole 1842 in the base) to the cover 1351. This base 1841 includes a protection wall 1843 sized to protect and guide the indicator body 1810. In the present instance, the protection wall 1843 has an arcuate shape and an arcuate upper edge. The base 1841 further has a grommet 1844 passing through the opening in the cover to guide and hold the probe 1820.

While the specific embodiments have been illustrated and described, numerous modifications come to mind without significantly departing from the spirit of the invention and the scope of protection is only limited by the scope of the accompanying claims.

We claim:

1. A barbecue grill assembly comprising:
    a support frame having front and rear horizontal, longitudinal and parallel members; and,
    a firebox having side members perpendicular to said longitudinal members, each with outwardly projecting opposed projections contoured to cover one of the longitudinal members and adapted for supporting the firebox between the longitudinal members, one projection extending towards the front longitudinal member and the other projection extending towards the rear longitudinal member.

2. The grill assembly of claim 1 wherein a cover is slidable between an open and closed position in a direction parallel to the longitudinal members.

3. The grill assembly of claim 1 wherein a cover has a hinged lid pivotable between an open and closed position about an axis disposed above and parallel to the rear longitudinal member.

4. The grill assembly of claim 1 further comprising a hood assembly having at least one arm extending towards the front longitudinal member and is contoured to rest upon the front longitudinal member.

5. The grill assembly of claim 4 wherein the hood assembly includes two opposed arms, the first arm extending towards the front longitudinal member and is contoured to rest upon the front longitudinal member and the second arm extending towards the rear longitudinal member and is contoured to rest upon the rear longitudinal member.

6. The grill assembly of claim 5 wherein the hood assembly includes a base assembly supported on the longitudinal members and a cover supported on and pivoting about the base assembly.

7. The grill assembly of claim 1 further comprising:
    a thermometer removably mounted on the cover having an indicator body at one end and a probe protruding through a wall of the cover; and,
    a thermometer mounting assembly adapted to releasably receive the probe secured to an inner surface of the cover wall, the mounting assembly having a base with an opening defining a passageway and generally opposing fingers extending from the base to a distal end directed toward the passageway, the fingers adapted to engage the probe to provide a retention force.

8. A hood assembly for a barbecue grill used in combination with a firebox having a means therein for supporting at least one burner, comprising:
    a separate base assembly supported above and adjacent the firebox; and,
    a cover supported on and pivoting about the base assembly;
    the grill includes two substantially parallel longitudinal members and the base assembly includes two side walls and a rear wall, each side wall having at least two outwardly projecting fingers, one finger extending towards a front longitudinal member and the other finger extending towards a rear longitudinal member, each finger contoured to cover one of the longitudinal members and adapted for maintaining the base assembly in position.

9. The hood assembly of claim 8 wherein the base assembly further includes a means for securement to the firebox.

10. The hood assembly of claim 8 wherein
    the cover is connected to the base assembly by pivot pins attached to opposed side walls of the base assembly in a location forwardly of a rear wall of the base assembly.

11. The hood assembly of claim 10 wherein an axis formed by the pivot pins attached to the cover passes through opposed side walls of the base assembly.

12. The hood assembly of claim 8 wherein
    the cover is connected to the base assembly by pivot pins attached to opposed side walls of the cover in a location forwardly of a rear wall of the cover.

13. The hood assembly of claim 9, 10 or 12 further comprising:
    a thermometer removably mounted on the cover having an indicator body one end and a probe protruding through a wall of the cover; and,
    a thermometer mounting assembly adapted to releasably receive the probe secured to an inner surface of the cover wall, the mounting assembly having a base with an opening defining a passageway and generally opposing fingers extending from the base to a distal end directed toward the passageway, the fingers adapted to engage the probe to provide a retention force.

14. A grill assembly comprising:
    a support frame having at least two parallel, generally elongated support members; and,
    a firebox having side members, each with outwardly projecting opposed projections contoured to cover one of the support members and adapted for supporting the firebox between the support members, one projection extending towards a first support member and the other projection extending towards a second support member;
    a hood assembly having (1) a base assembly having two opposed arms, each arm extending towards a support member and contoured to rest upon an opposed projection covering a support member and (2) a cover supported on and pivoting about the base assembly.

15. The grill assembly of claim 14 the cover further includes a front lip contoured and adapted for engaging and resting upon either one of the opposed arms covering a support member or the support member.

16. The grill assembly of claim 15 wherein an opposed arm is nestled between the lip on the cover and a support member.

17. A barbecue grill assembly comprising:
    a support frame having at least two generally parallel, substantially horizontal, elongated support members, each having at least one end;
    a firebox supported by said support frame; and,
    a U-shaped extension member cooperating with the one end of the support members, the extension member being exposed and extending outwardly from said support members and having opposed arcuate corners.

18. The grill assembly of claim 17 wherein the support members are tubular and the extension member is tubular, the extension member fitting either inside or around the ends of the support members to frictionally couple one another.

19. The grill assembly of claim 18 wherein each support member has a first end and a second end and each first end cooperates with a first extension member and each second end cooperates with a second extension member.

20. The grill assembly of claim 18 further comprising a work shelf having at least two opposing outwardly extending flanges contoured to engage and rest upon an upper surface of the support members to support the work shelf between the support members.

21. The grill assembly of claim 20 wherein each flange is arcuate in cross section to conform either to the tubular shape of either the extensions or the support members.

22. The grill assembly of claim 1 further comprising a work shelf having at least two opposing outwardly extending flanges contoured to engage and rest upon an upper surface of the support members to support the work shelf between the support members.

23. A barbecue grill assembly comprising:

a support frame having front and rear generally horizontal and parallel upper elongated members;

a firebox having side members, each with outwardly projecting opposed projections contoured to cover one of the upper elongated members and adapted for supporting the firebox between the upper elongated members, one projection extending towards the front upper elongated member and the other projection extending towards the rear upper elongated member;

two generally horizontal and parallel lower elongated members; and, a lower shelf having at least two flanges contoured to engage and adapted to be supported by and between an upper surface of the lower elongated members.

24. The grill assembly of claim 23 further comprising a work shelf having at least two opposing outwardly extending flanges contoured to engage and rest upon an upper surface of the upper elongated members to support the work shelf between the upper elongated members, the upper elongated members being rounded tubing and flanges being arcuate.

25. The grill assembly of claim 24 wherein each upper elongated member has a first end and a second end and each first end cooperates with a first extension member and each second end cooperates with a second extension member.

26. The grill assembly of claim 25 wherein the extension members are U-shaped.

* * * * *